US007940498B2

(12) United States Patent
Huang

(10) Patent No.: US 7,940,498 B2
(45) Date of Patent: May 10, 2011

(54) CIRCUIT INTERRUPTING DEVICE WITH HIGH VOLTAGE SURGE PROTECTION

(75) Inventor: Huadao Huang, Wenzhou (CN)

(73) Assignee: Huadao Huang (CN)

( * ) Notice: Subject to any disclaimer, the term of this patent is extended or adjusted under 35 U.S.C. 154(b) by 594 days.

(21) Appl. No.: 12/000,530

(22) Filed: Dec. 13, 2007

(65) Prior Publication Data

US 2009/0086390 A1 Apr. 2, 2009

(30) Foreign Application Priority Data

Sep. 30, 2007 (CN) ...................... 2007 2 0178404 U
Sep. 30, 2007 (CN) ...................... 2007 2 0178405 U
Sep. 30, 2007 (CN) ...................... 2007 2 0178406 U
Sep. 30, 2007 (CN) ...................... 2007 2 0178407 U

(51) Int. Cl.
*H02H 3/00* (2006.01)
*H02H 9/08* (2006.01)
*H01H 9/28* (2006.01)

(52) U.S. Cl. .......................... 361/42; 200/43.11; 355/18

(58) Field of Classification Search .................. 361/118, 361/42; 200/43.11; 355/18
See application file for complete search history.

(56) References Cited

U.S. PATENT DOCUMENTS

RE26,694 E * 10/1969 Hansen et al. ................ 313/325
3,717,805 A * 2/1973 Gnaedinger et al. ............ 363/13
3,743,891 A * 7/1973 Buxton ......................... 361/636
4,315,328 A 2/1982 Schwab
4,386,338 A 5/1983 Doyle et al.
4,518,945 A 5/1985 Doyle et al.
4,595,894 A 6/1986 Doyle et al.
4,831,496 A 5/1989 Brant et al.
5,202,662 A 4/1993 Bienwald et al.
5,594,398 A 1/1997 Marcou et al.
5,654,857 A 8/1997 Gershen
5,680,287 A 10/1997 Gernhard et al.
5,963,408 A 10/1999 Neiger et al.
6,040,967 A 3/2000 DiSalvo
6,052,265 A 4/2000 Zaretsky et al.
6,111,733 A 8/2000 Neiger et al.
6,226,161 B1 5/2001 Neiger et al.
6,246,558 B1 6/2001 DiSalvo et al.
6,252,407 B1 * 6/2001 Greshen ........................ 324/509
6,282,070 B1 8/2001 Ziegler et al.
6,288,882 B1 9/2001 DiSalvo et al.
6,309,248 B1 10/2001 King
6,381,112 B1 4/2002 DiSalvo
6,437,953 B2 8/2002 DiSalvo et al.
6,469,881 B2 10/2002 Gershen et al.
6,580,344 B2 6/2003 Li
6,671,145 B2 12/2003 Germain et al.
6,861,595 B2 * 3/2005 Passow ....................... 200/16 R
6,864,766 B2 3/2005 DiSalvo et al.
6,900,972 B1 * 5/2005 Chan et al. .................... 361/111
6,952,150 B2 10/2005 Radosavljevic et al.
6,958,895 B1 10/2005 Radosavljevic et al.

(Continued)

*Primary Examiner* — Stephen W Jackson
*Assistant Examiner* — Zeev Kitov
(74) *Attorney, Agent, or Firm* — Andrews Kurth LLP

(57) ABSTRACT

The present invention provides a circuit interrupting device which is capable of providing protection against electrical surge through its innovative electrical discharge design; establishing or discontinuing electrical continuity among the input power source, output load, and user accessible load through its innovative contacts connection/disconnection design; automatic or manual testing of the condition of the key components in the circuit interrupting device by way of a simulated leakage current; and testing whether the device is properly wired by way of a reset switch.

22 Claims, 16 Drawing Sheets

U.S. PATENT DOCUMENTS

| | | | | |
|---|---|---|---|---|
| 6,963,260 | B2 | 11/2005 | Germain et al. | |
| 6,987,657 | B2 * | 1/2006 | Domejean et al. | 361/117 |
| 7,019,952 | B2 | 3/2006 | Huang et al. | |
| 7,049,910 | B2 | 5/2006 | Campolo et al. | |
| 7,049,911 | B2 | 5/2006 | Germain et al. | |
| 7,068,481 | B2 | 6/2006 | Radosavljevic et al. | |
| 7,154,718 | B1 | 12/2006 | Finlay, Sr. et al. | |
| 7,164,564 | B1 * | 1/2007 | Finlay et al. | 361/42 |
| 7,212,386 | B1 * | 5/2007 | Finlay et al. | 361/42 |
| 7,283,340 | B1 | 10/2007 | Finlay, Sr. et al. | |

* cited by examiner

CIRCUIT INTERRUPTING DEVICE WITH HIGH VOLTAGE SURGE PROTECTION

RELATED APPLICATION

The present application claims the priority of Chinese patent application Nos. 200720178404.5, 200720178405.X, 200720178407.9 and 200720178406.4, all filed on Sep. 30, 2007, the contents of which are herein incorporated by reference.

FIELD OF THE INVENTION

The present invention relates to a circuit interrupting device, preferably a ground fault circuit interrupter, which is capable of providing protection against electrical surge through its innovative electrical discharge design; establishing or discontinuing electrical continuity among the input power source, output load, and user accessible load through its innovative contacts connection/disconnection design; automatic or manual testing of the conditions of the key components in the circuit interrupting device by way of a simulated leakage current; and testing whether the device is properly wired by way of a reset switch.

BACKGROUND OF THE INVENTION

Due to increasingly higher demands for safety of ground fault circuit interrupters (GFCIs), it is desirable to provide safety measures for the GFCIs to allow an end user to find out whether the components of the GFCIs are working properly, whether the GFCIs are properly wired, and whether there is power to the output load. Additionally, it is desirable to extend the life span of the GFCIs by designing a feature that can protect the GFCIs from high voltage surge, such as lightning. The invention described below is designed to encompass the safety functions set forth above.

SUMMARY OF THE INVENTION

The present invention provides four embodiments which can be adopted by a circuit interrupting device either separately or in any combinations to provide various features and functions to the circuit interrupting device.

The first embodiment of the present invention provides a circuit interrupting device, preferably a ground fault circuit interrupter (GFCI), which has an input end which is electrically connected to an input power source, an output end which is electrically connected to an output terminal, and a user accessible load end which is electrically connected to a user accessible output socket. The circuit interrupting device comprises a pair of input power connecting pieces. Each of the input power connecting pieces is electrically connected to a hot or a neutral wire of the input power source respectively, and the hot wire of the input power source is preferably operationally connected to the neutral wire of the input power source through a solenoid coil and a metal oxide varistor (MOV).

Also, each of the input power connecting pieces has an end which is extended to a discharge metal piece having a tip. The tip of the discharge metal piece from one input power connecting piece faces, but does not contact with, the tip of the discharge metal piece from the other input power connecting piece. During a high voltage surge, such as lightning, this pair of the discharge metal pieces from the pair of input power connecting pieces causes a discharge of electricity through the tips of the discharge metal pieces to protect the circuit interrupting device from being damaged due to the high voltage surge. The circuit interrupting device further comprises a pair of input flexible metal pieces which is electrically connected to the input power source. Each of the input flexible metal pieces comprises a discharge metal piece which has a tip. The tip of the discharge metal piece from one input flexible metal piece faces but not contacts the tip of the discharge metal piece of the other input flexible metal piece.

The second embodiment of the present invention provides a circuit interrupting device, preferably a GFCI, which comprises: (1) a pair of output power conductors extended to the user accessible load end; each of the output power conductors comprises a fixed contact and an output conductor flexible metal piece containing a movable contact; (2) a pair of output terminal metal pieces, each comprising a fixed contact; and (3) a pair of input flexible metal pieces electrically connected to the input power source; each of the pair of the input flexible metal pieces contains a movable contact. The movable contact of the output conductor flexible metal piece is capable of connecting/disconnecting to the fixed contact on one of the output terminal metal pieces and each of the input flexible metal pieces is capable of connecting/disconnecting to the fixed contact on one of the output conductors to establish or discontinue the electrically continuity between the input end, the output end, and the user accessible load end.

The input flexible metal piece of the second embodiment is adapted to operationally pass through a differential transformer.

The circuit interrupting device further comprises a tripping mechanism located underneath a reset button comprising a reset support piece and a tripping device. The tripping device moves with the reset button when the reset button is depressed or released; the tripping device further extends outward to form a pair of lifting arms; each of the pair of lifting arms has an upper step and a lower step, each having a protrusion which is capable of passing through a through hole on the output conductor flexible metal piece or the input flexible metal piece to be connected to the reset support piece.

The reset support piece and the tripping device each contains a through hole which is aligned to allow a directional lock from underneath the reset button to pass through. The directional lock is capable of passing through a hole in a locking member when the reset button is depressed and a solenoid coil is energized to reset the circuit interrupting device. It is preferred that the directional lock has a larger diameter in an upper part than in a lower part. Also, the width of the reset support piece is preferred to be shorter than that of the pair of lifting arms extended out from the tripping device.

The third embodiment of the present invention provides a circuit interrupting device, preferably a GFCI, which comprises a simulated leakage current generating switch (KR-1) coupled to the reset button. When the circuit interrupting device is properly wired and in a tripped state, the simulated leakage current generating switch automatically causes the circuit interrupting device to generate a simulated leakage current which can test components of the circuit interrupting device.

The simulated leakage current generating switch comprises a first switch piece, a second switch piece, and a third switch piece, which are in triangular arrangement with the first switch piece located at the bottom; the second switch piece situated in the middle; and the third switch piece located at the top. The first switch piece is in series with a resistor and is electrically connected to a neutral line of the input power source. The first switch piece has a contact located at the upper end of the first switch piece. The second switch piece is electrically connected to a hot line of the input power source via a solenoid coil. The second switch piece has two contacts located at the upper and the lower ends of the second switch piece. The third switch piece is electrically connected to the positive pole of a silicon controlled rectifier (SCR), which is then electrically connected to the neutral line of the input power source. The third switch piece has a contact located at a lower end of the third switch piece. The second switch piece is in contact with the first switch piece when the circuit interrupting device is connected to the wall and the reset button is in a tripped state to allow the simulated leakage current to be generated automatically.

The reset button has a reset support piece located underneath it. A touch pin extends downward from one corner of the reset support piece. When the circuit interrupting device is properly wired and in a tripped state, the springing activity by a quick trip spring, which is slid onto the directional lock, pushes the touch pin of the reset support piece to extend downward and steadily press onto the second switch piece, thus pushing the second switch piece into contact with the first switch piece to allow the simulated leakage current to be generated automatically The simulated leakage current ceases to be generated when said circuit interrupting is reset.

The circuit interrupting device further comprises a test switch (KR-5) coupled to a test button. The test switch comprises a flexible test switch piece and a metal piece in series with a second simulated leakage current generating resistor. When the test button is depressed, the flexible test switch piece is in contact with the metal piece to manually generate the simulated leakage current to test the circuit interrupting device. The flexible test switch piece is electrically connected to a hot wire of the load end and the metal piece is electrically connected to a neutral wire of said input power end.

The circuit interrupting device further comprises a reset indicator light. When the device is properly wired and in a tripped state, if the components of the circuit interrupting device work properly, the reset indicator light lights up.

Additionally, the circuit interrupting device comprises a power output indicator light. When the circuit interrupting device has power to the output end and the user accessible load end, the power output indicator light is lit.

The components of the circuit interrupting device that can be tested by the simulated leakage current comprises solenoid coil and silicon controlled rectifier (SCR). Additionally, the differential transformer and the leakage current detection integrated chip can also be tested.

The final embodiment of the present invention provides a circuit interrupting device which comprises a reset switch (KR-4) coupled to a reset button. The reset switch comprises a flexible metal switch piece and an electric contact. When the circuit interrupting device is properly wired and in a stripped state, a depression of the reset button allows the flexible metal switch piece to be in contact with the electric contact to allow reset.

One end of the flexible metal switch piece is electrically connected to a hot wire of the input power end through a solenoid coil and the other end is suspended. The electric contact is electrically connected to the positive pole of a silicon controlled rectifier (SCR), which is then electrically connected to a neutral wire of the input power end. When the reset button is depressed, the flexible metal switch piece is in contact with the electric contact.

Alternatively, one end of the flexible metal switch piece is electrically connected to a neutral wire of the input power end through a solenoid coil and the other end is suspended. The electric contact is electrically connected to a hot wire of the input power end through the positive pole of a silicon controlled rectifier (SCR). When the reset button is depressed, the flexible metal switch piece is in contact with said electric contact.

BRIEF DESCRIPTION OF THE DRAWINGS

FIG. 7-1 is a partial cross-sectional view along the B-B line in FIG. 3. It is an illustration of the relationships among the parts how the GFCI works initially when there is no power output.

FIG. 7-2 is a partial cross-sectional view along the B-B line in FIG. 3. It is an illustration of the relationships among the parts when the reset button is depressed.

FIG. 7-3 is a partial cross-sectional view along the B-B line in FIG. 3. It is an illustration of the relationships among the parts after the device has been reset and the GFCI works normally and has power output.

FIG. 7-4 is a partial cross-sectional view along the B-B line in FIG. 3. It is an illustration of the relationships among the parts when the test button is depressed to cut off power output to the load and user accessible load of the GFCI.

FIG. 8-1 is a partial cross-sectional view along the C-C line in FIG. 3. It is an illustration of the relationships among the parts after the reset button is depressed and the interrupter has power output.

FIG. 8-2 is a partial cross-sectional view along the C-C line in FIG. 3. It is an illustration of the relationships among the parts when the device is tripped and the GFCI has no power output.

FIG. 9-1 is a partial cross-sectional view along the A-A line in FIG. 3. It is an illustration of the relationships among the parts when the device is in a tripped state.

FIG. 9-2 is a partial cross-sectional view along the A-A line in FIG. 3. It is an illustration of the relationships among the parts the instant the reset button is pressed.

FIG. 9-3 is a partial cross-sectional view along the A-A line in FIG. 3. It is an illustration of the relationships among the parts after the device has been reset.

DETAILED DESCRIPTION OF THE INVENTION

Figure 1:
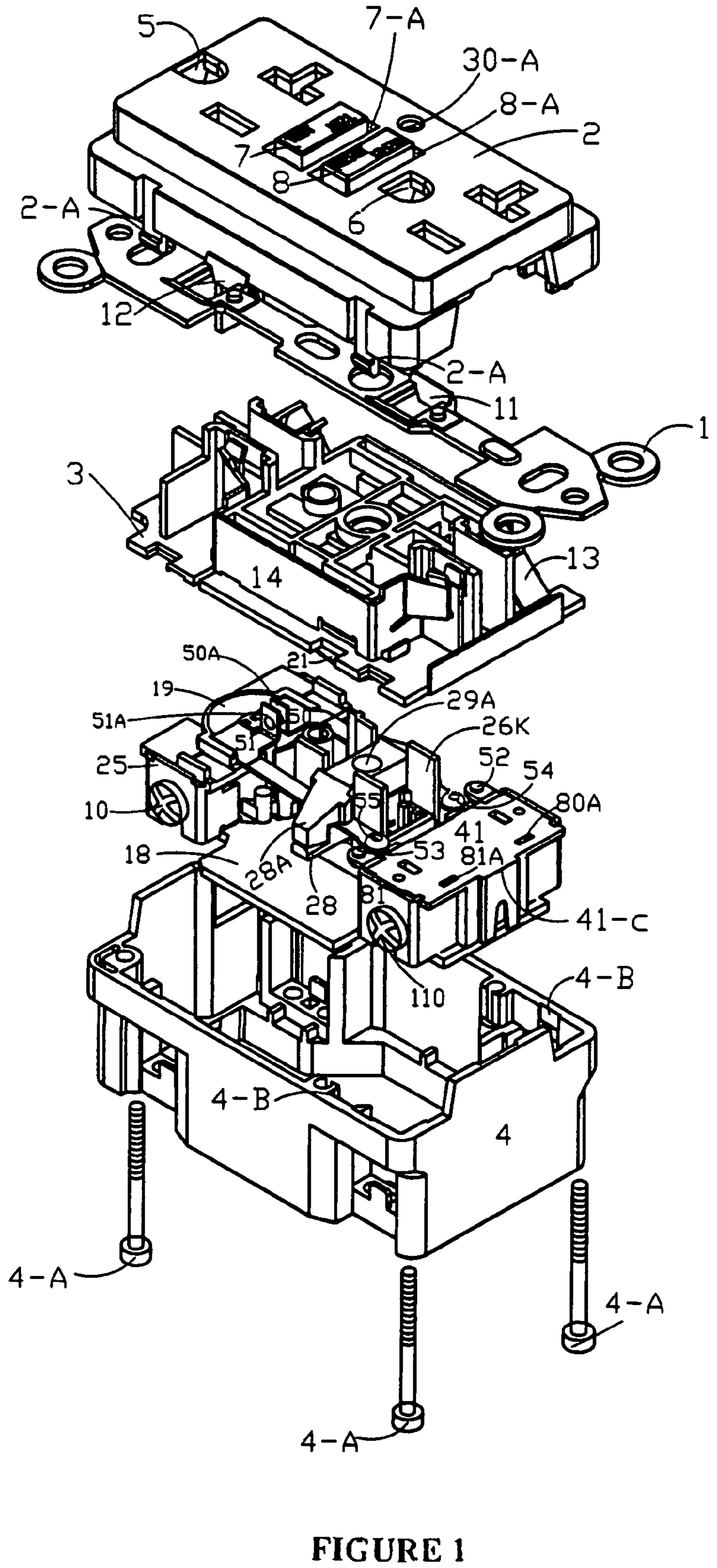
FIG. 1 is an exploded cubic schematic of the structure of the present invention.

As shown in FIG. 1, the GFCI disclosed by the present invention mainly comprises a housing, and a circuit board 18 which is installed inside the housing.

Within the housing, there are upper cover 2, insulated middle support 3 and base 4. Between upper cover 2 and insulated middle support 3, there is metal mounting strap 1. Circuit board 18 is installed between insulated middle support 3 and base 4.

Figure 2:
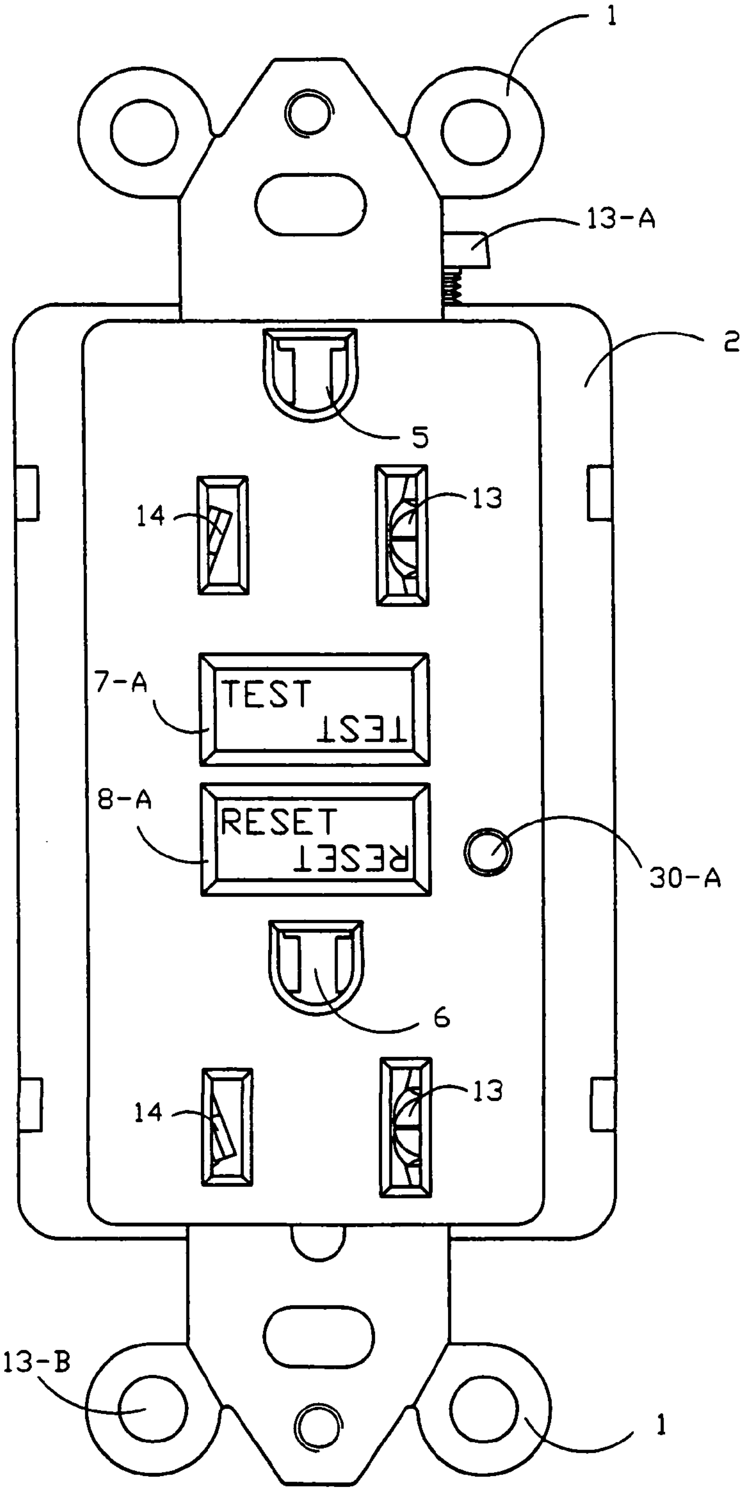
FIG. 2 is the main view of the present invention.

As shown in FIG. 1 and FIG. 2, upper cover 2 contains power output sockets 5 and 6, reset button hole 8-A, test button hole 7-A and status indicator hole 30-A. Reset button (RESET) 8 and test button (TEST) 7 are placed inside reset button hole 8-A and test button hole 7-A, respectively. Reset button 8 and test button 7 pass through metal strap 1 and insulated middle support 3, and come into contact with the component assembly on circuit board 18. There are four clamp hooks 2-A on both sides of upper cover 2 which are used to securely connect base 4 through fasten groove 4-B located on the inner side of base 4.

Metal mounting strap 1 is located between upper cover 2 and insulated middle support 3, and is connected to the ground through ground screw 13-A. Grounding vanes 11 and 12 are located on metal mounting strap 1, at locations vertically corresponding to the grounding holes on power output sockets 5 and 6 of upper cover 2. Installation holes 13-B are placed on both ends of metal mounting strap 1.

Figure 3:
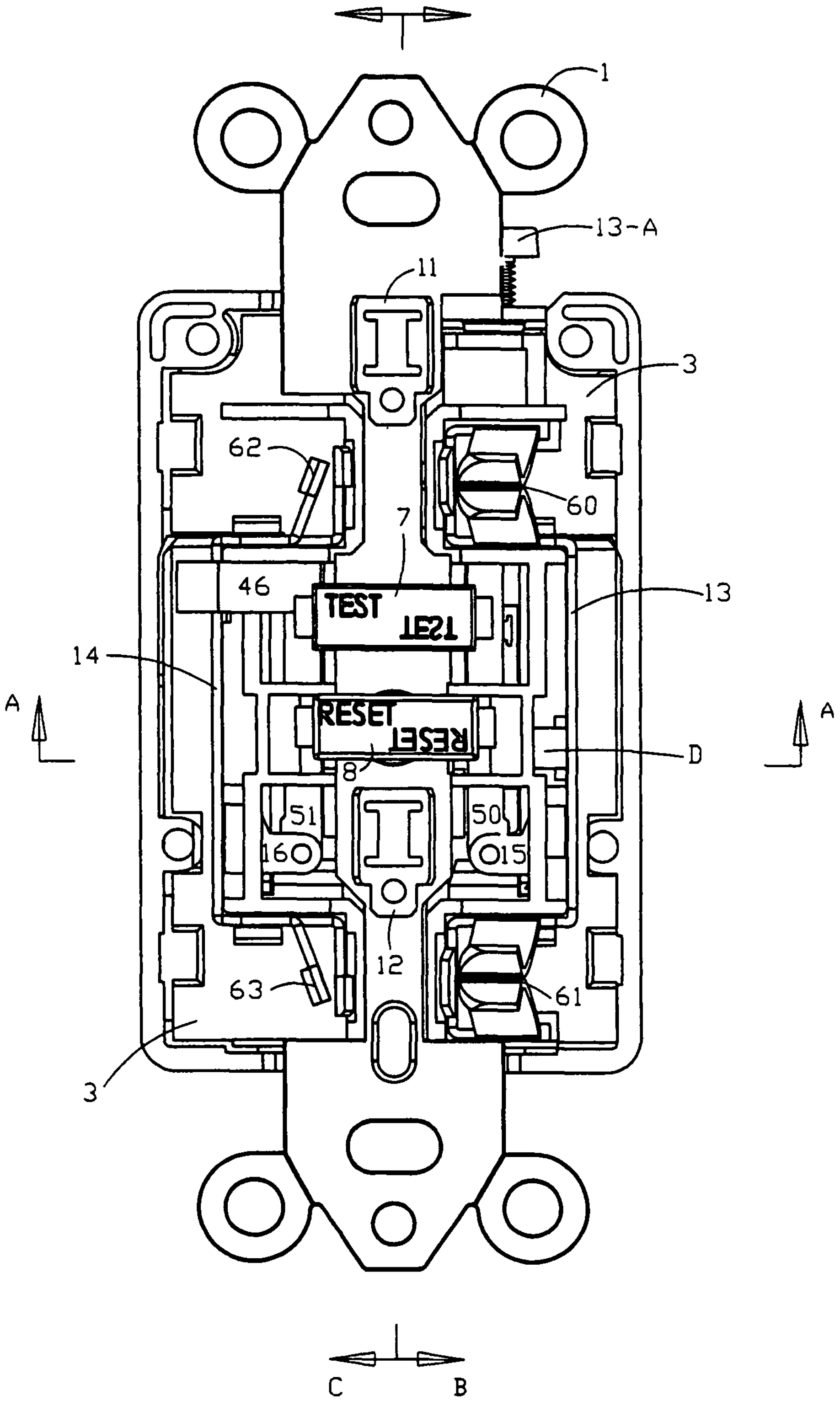
FIG. 3 is the front view of the present invention with the upper lid removed.
Figure 4:
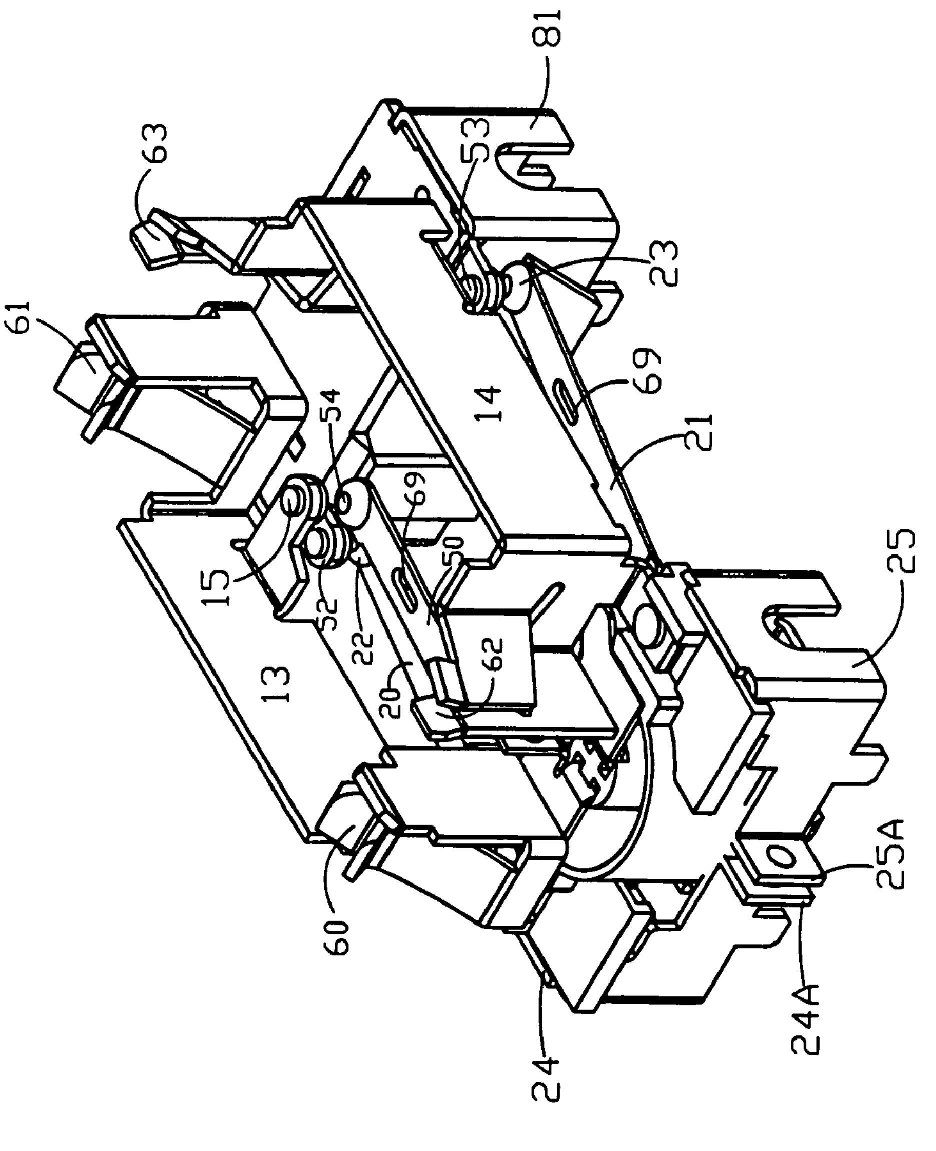
FIG. 4 is an illustration of the relationships among the input flexible metal pieces, output conductors, output conductor flexible metal pieces, and output terminal metal pieces of the present invention and their structures.

As shown in FIG. 1 and FIG. 3, a hot power line output conductor 14 and a neutral power line output conductor 13 are respectively placed on both sides of insulated middle support 3 within the housing and extended to contain gripping wing pieces 60, 61, 62 and 63. Gripping wing pieces 60, 61, 62 and 63 are located directly under the neutral power line holes and hot power line holes of power output sockets 5 and 6 of upper cover 2. As shown in FIG. 3 and FIG. 4, on one end of hot power line output conductor 14, there is a fixed contact 16. On the other end of hot power line output conductor 14, there is an output conductor flexible metal piece 21 which is connected to the output conductor 14 by a rivet. A movable contact 23 is attached to the end of output conductor flexible metal piece 21. Similarly, at one end of neutral power line output conductor 13, there is a fixed contact 15. On the other end of neutral power line output conductor 13, there is an output conductor flexible metal piece 20 which is connected to the output conductor 13 by a rivet. A movable contact 22 is attached to the end of output conductor flexible metal piece 21.

As shown in FIG. 1, base 4 is used to accommodate insulated middle support 3 and control circuit board 18. On the two sides of base 4, a pair of neutral power line and hot power line input wiring screws 9 and 10 and a pair of neutral power line and hot power line output wiring screws 109 and 110 are symmetrically placed.

The core component of the present invention is control circuit board 18 which is installed within the housing. It has the functions of causing power outlet sockets 5 and 6 on upper cover 2 of the GFCI and power output wiring screw 109 and 110 located on both sides of base 4 to have or not to have power output; testing the components of the GFCI to determine whether these components have come to an end of their service life; displaying the test result by indicator lights on upper cover 2 and causing the reset button to reset or to trip; protecting the device against high voltage surge such as lightning; and preventing any reverse wiring error occurred during the installation of the GFCI.

Figure 5:
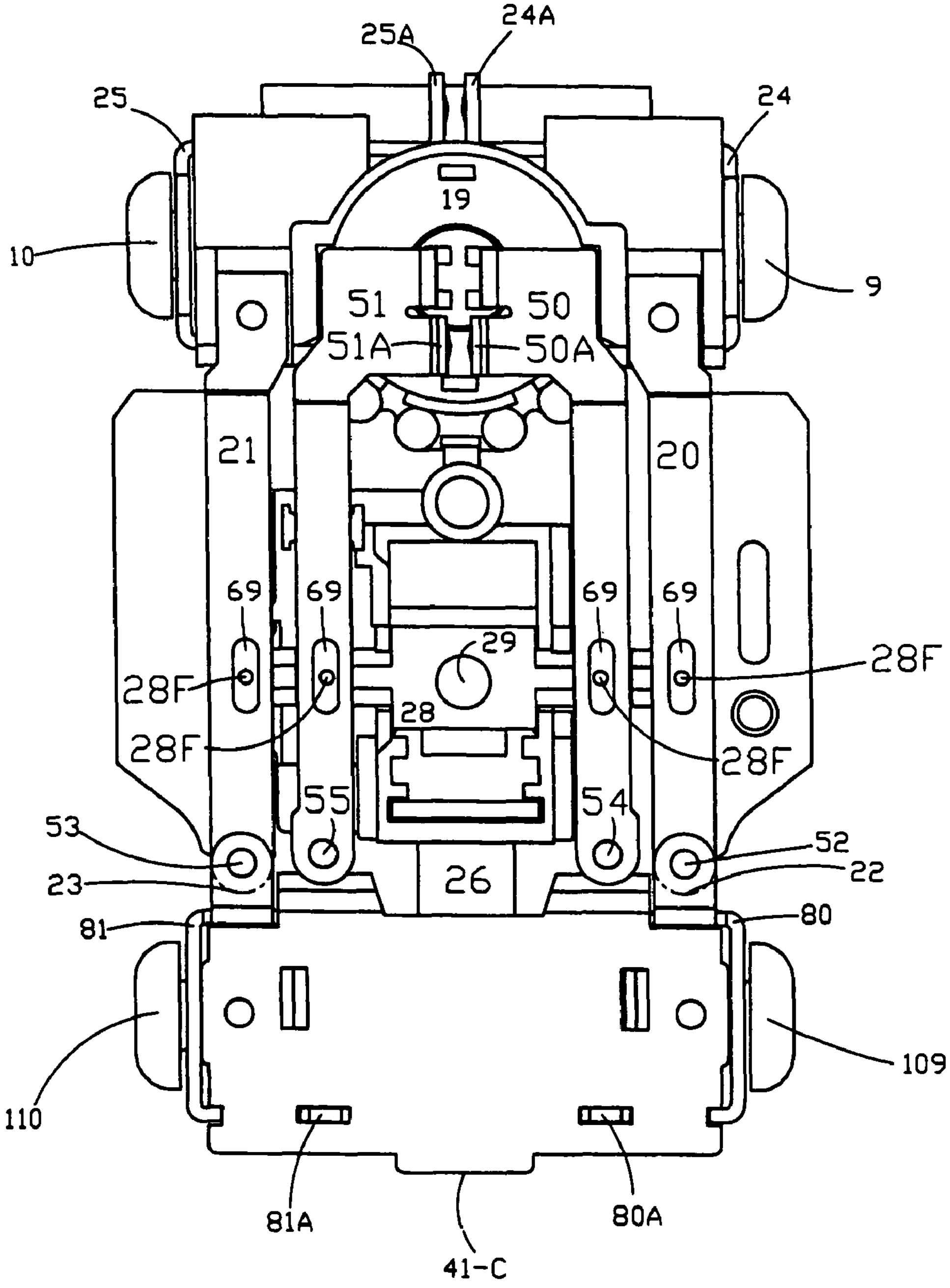
FIG. 5 is an illustration of the relationships among the parts which can be viewed on top of the printed circuit board of the present invention.

As shown in FIG. 1 and FIG. 5, on circuit board 18, there are a pair of hot power line and neutral power line input flexible metal pieces 51 and 50. One end of power input flexible metal pieces 51 and 50 is bent 90 degrees downward to facilitate power input flexible metal pieces 51 and 50 to pass through differential transformer 19. Alternatively, power input flexible metal pieces 51 and 50 can be fastened to separate pieces which in turn pass through differential transformer 19. The power input flexible metal pieces 51 and 50 can either weld onto circuit board 18 or directly connect to hot power line, neutral power line input wiring screws 10 and 9 through input power connecting pieces 25 and 24. Hot power line input wiring screw 10 is connected to a hot power line inside the wall through a wire. Neutral power line input wiring screw 9 is connected to a neutral power line inside the wall through a wire. Movable contacts 55 and 54 are placed on the other end of input flexible metal pieces 51 and 50.

Hot and neutral power output terminal metal pieces 81 and 80 are welded onto the other end of circuit board 18 and come into contact with power output wiring screws 110 and 109. Hot and neutral power output terminal metal pieces 81 and 80 contain fixed contacts 53 and 52 respectively which are protruded sideward from the metal pieces.

As shown in FIG. 3, FIG. 4 and FIG. 5, movable contacts 54 and 55 on power input flexible metal pieces 51 and 50 respectively come into contact with or disconnect from a pair of fixed contacts 16 and 15 on output conductors 14 and 13 above insulated middle support 3, forming a group of hot line and neutral line power switches. Movable contacts 23 and 22 on the pair of output conductor flexible metal pieces 21 and 20 come into contact with or disconnect from fixed contacts 53 and 52 on power output terminal metal pieces 81 and 80, forming another group of hot line and neutral line power switches. The movable and fixed contacts on power input flexible metal pieces 51 and 50, power output conductors 14 and 13, output conductor flexible metal pieces 21 and 20 as well as on power output terminal metal pieces 81 and 80 form a total of two groups of hot line and neutral line power switches 55 and 16, 54 and 15, 23 and 53, and 22 and 52, which respectively correspond to switches KR-2-1, KR-2-2, KR-3-1 and KR-3-2 in wiring diagram in FIG. 10.

Figures 1, 7:
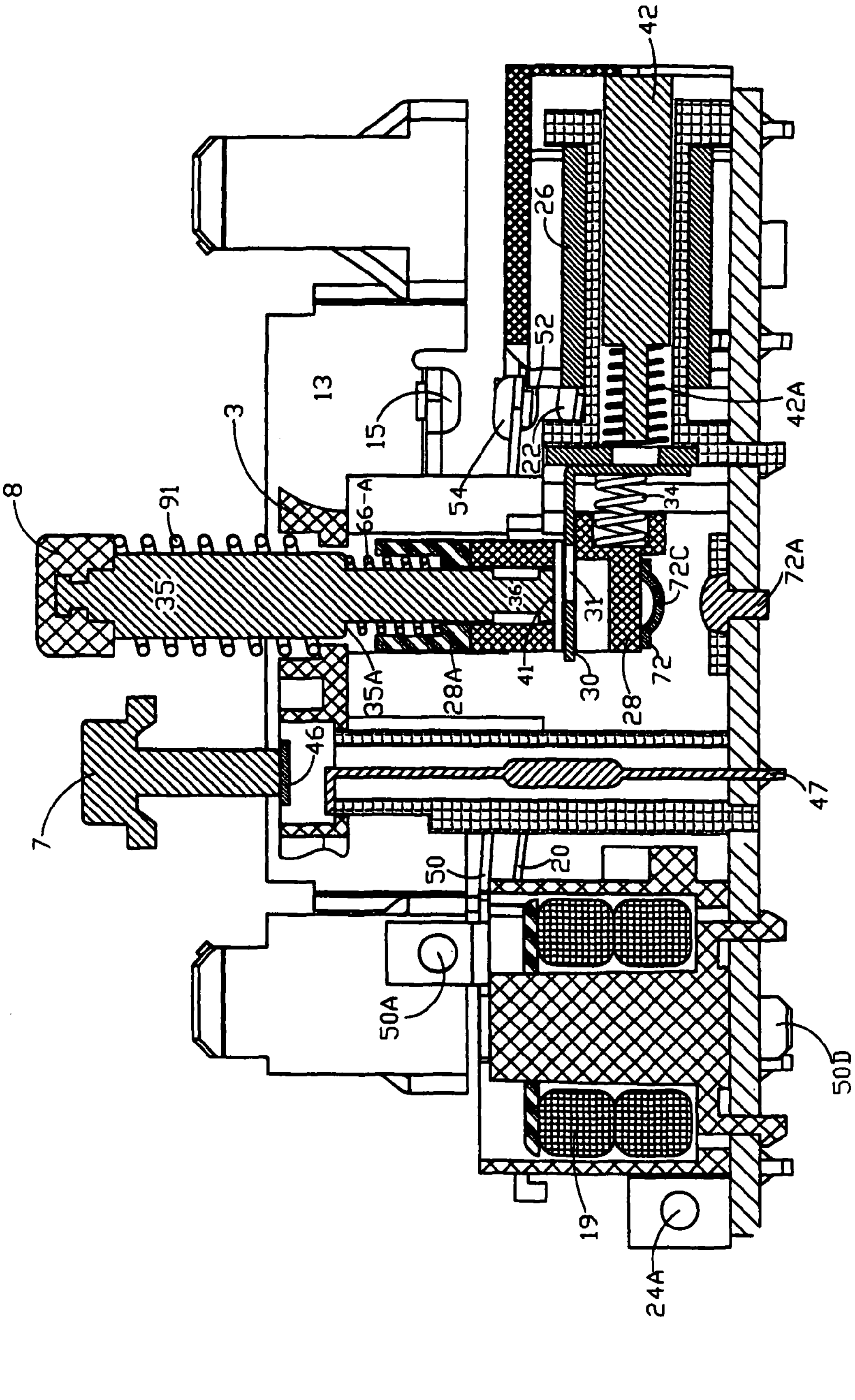
Figures 2, 7:
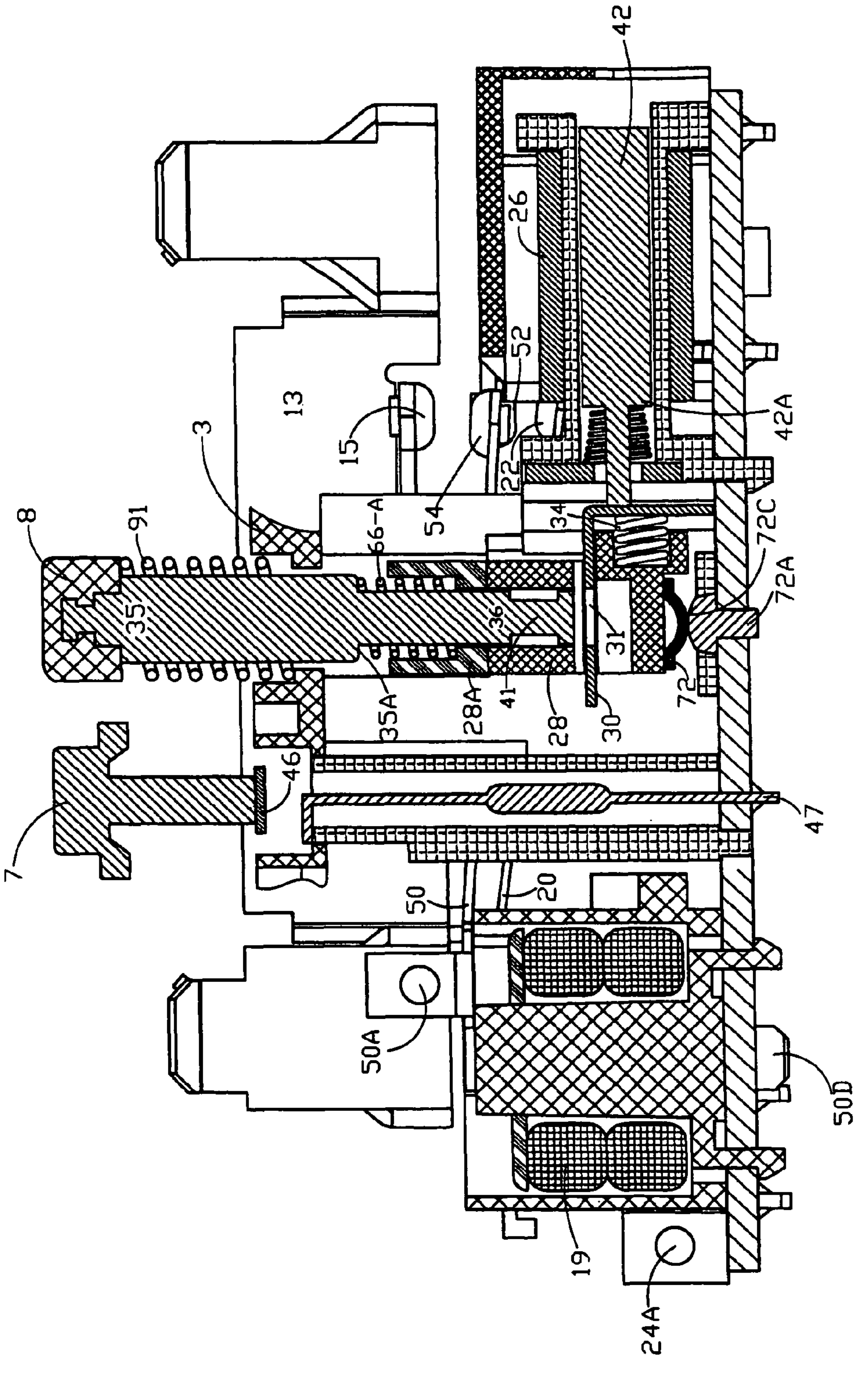
Figures 3, 7:
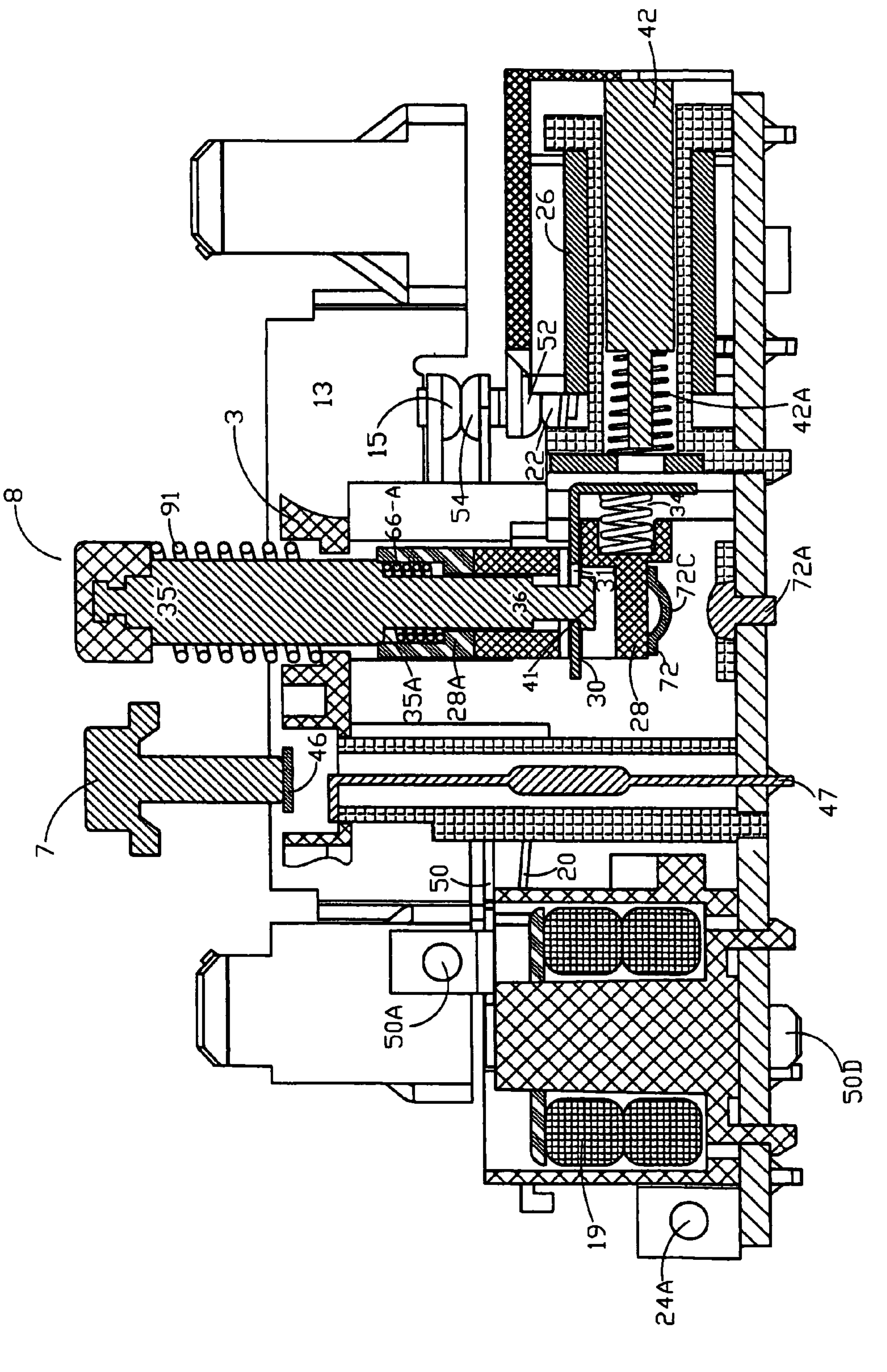
Figures 4, 7:
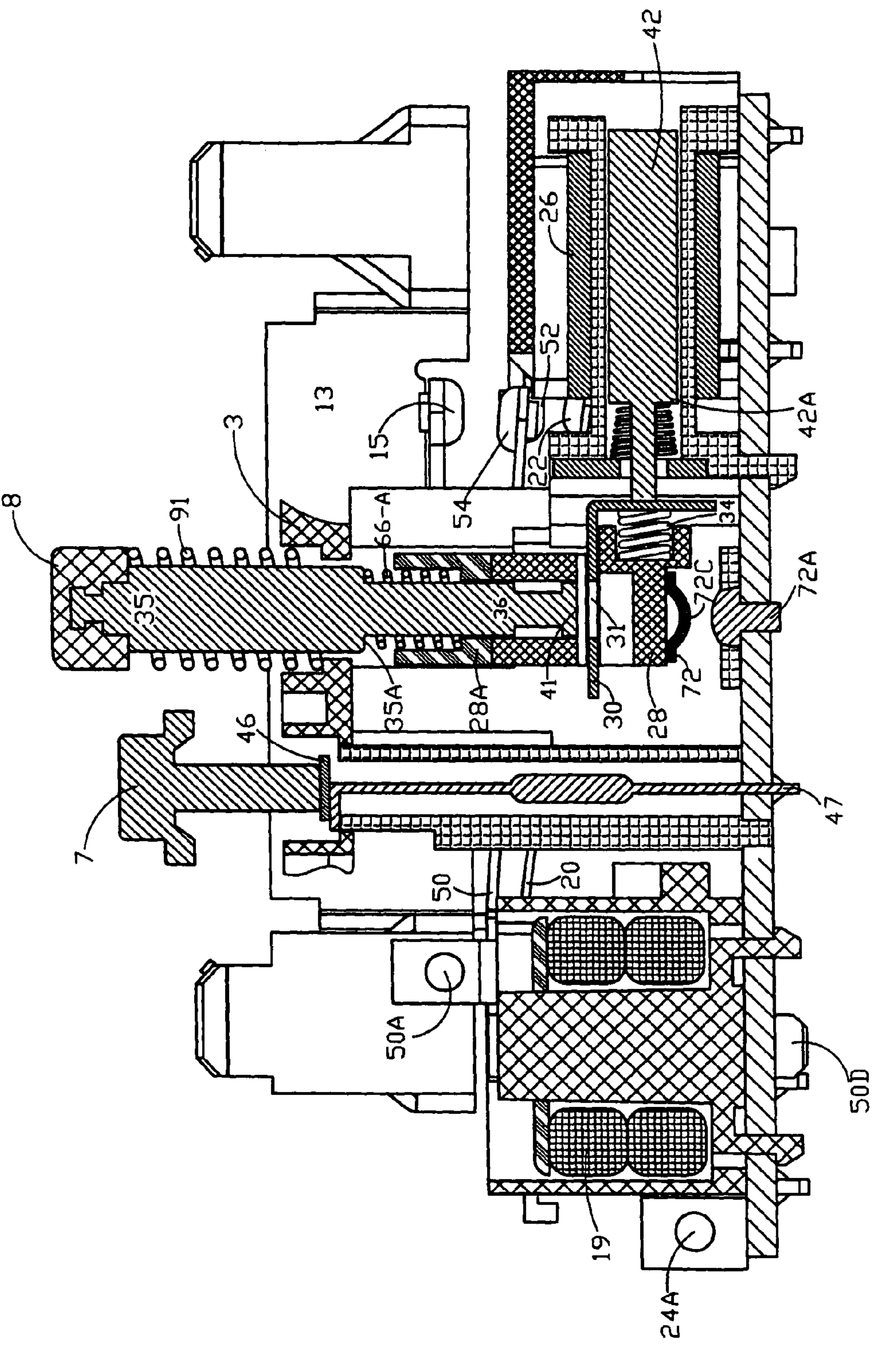
Figure 10:
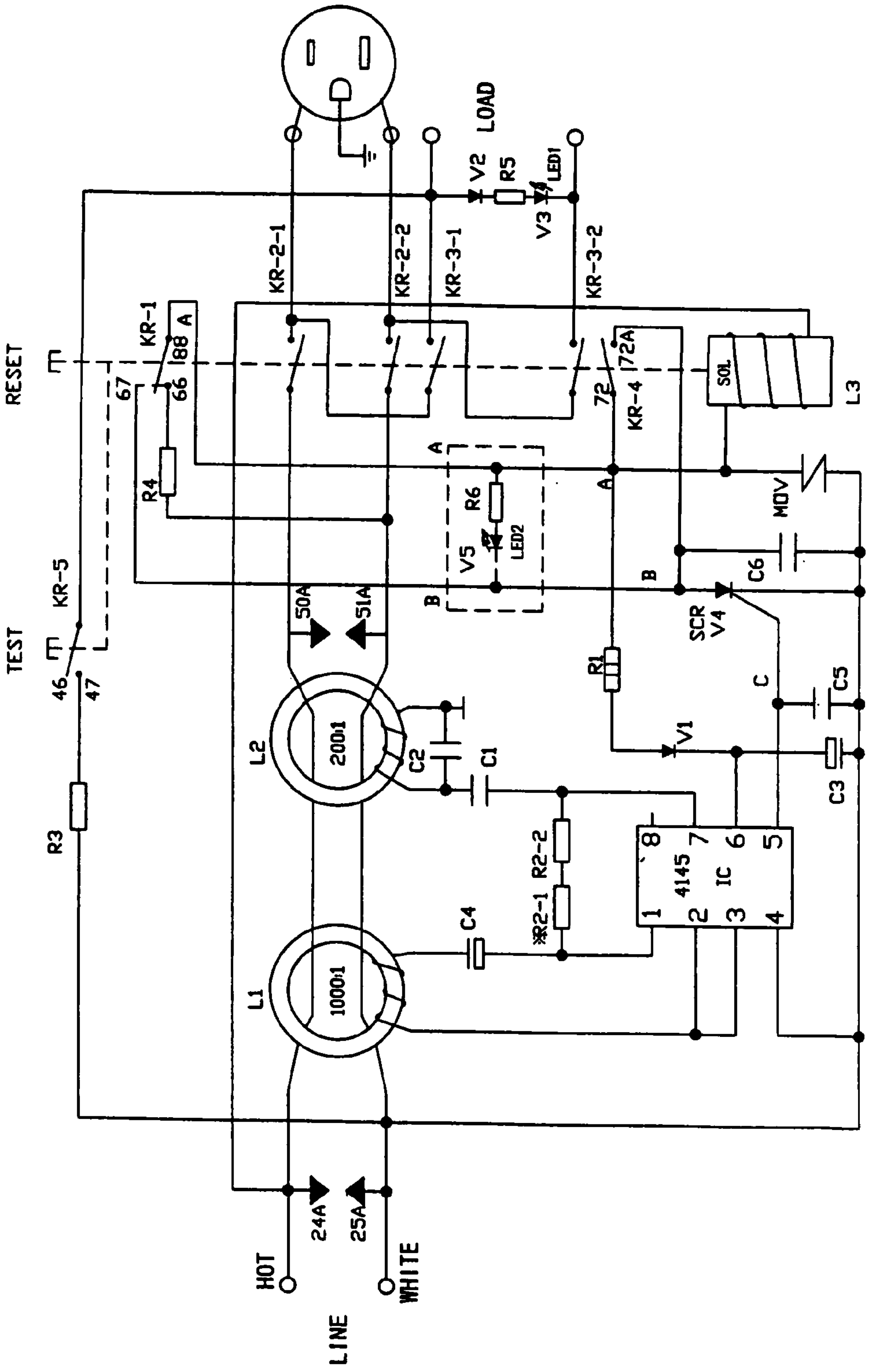
FIG. 10 is a detailed circuitry on the control circuit board of the GFCI of the present invention.

As shown in FIG. 1, FIG. 5 and FIG. 7-1, there is also a differential transformer 19 on circuit board 18 which is used for detecting leakage currents. As shown in FIG. 10, the hot power line HOT and neutral power line WHITE pass through differential transformer 19 (L1 and L2 in the figure). When there is a leakage current (i.e., an imbalance current between the hot and white lines) on the power supply loop, the differential transformer will output a voltage signal to the leakage current detection control chip IC (model No. RV4145). Pin 5 of the chip IC outputs a control signal to silicon controlled rectifier (SCR), causing the reset/tripping mechanical device on circuit board 18 to act, so that reset button 8 pops up and the GFCI trips, cutting off the power output from the GFCI.

As shown in FIG. 1, FIG. 5, FIG. 6, FIG. 7-1 and FIG. 9-1, a reset/tripping mechanical device is also placed on circuit board 18 which causes input flexible metal pieces 50 and 51 to be electrically connected to or disconnected from output conductors 13 and 14, and causes output conductor flexible metal pieces 20 and 21 to be electrically connected to or disconnected from power output terminal metal pieces 80 and 81. The reset/tripping mechanical device includes a directional lock 35 which is embedded underneath reset button 8; reset spring 91 and quick trip spring 66-A which are slid onto directional lock 35; a reset support piece 28A; a "T" shaped tripping device 28 coupled to reset button 8; locking member 30; locking member spring 34; simulated leakage current generating switches 66, 67 and 88 which are coupled to reset button 8; reset switches 72 and 72A and solenoid coil 26.

The reset support piece 28A is made of plastic and is located below and coupled to reset button 8. The left and right sides of the "T" shaped tripping device 28 extend outward to form a pair of stepped lifting arms. In an embodiment of the present invention, the left and right lifting arms 27A and 28B are shaped like two steps. A small protruding cylinder 28F is placed on each step. Reset support piece 28A is located below reset button 8 and above the "T" shaped tripping device 28. To facilitate assembly, the length of reset support piece 28A is preferred to be shorter than the span of the lifting arms from the tip of the left to the tip of the right sides of tripping device 28. Recessed round holes are placed on the bottom surface of reset support piece 28A in places that receive protruding cylinders 28F on the left and right lifting arms of tripping device 28 to connect reset support piece 28A to tripping device 28 so that both pieces can move up and down with reset button 8. At the same time, reset support piece 28A can also be detached from tripping device 28. In solenoid framework 26K of solenoid coil 26 which accommodates reset support piece 28A and tripping device 28, there is a limiting block 26Z which limits the lowest possible movement of reset support piece 28A.

Figures 1, 9:
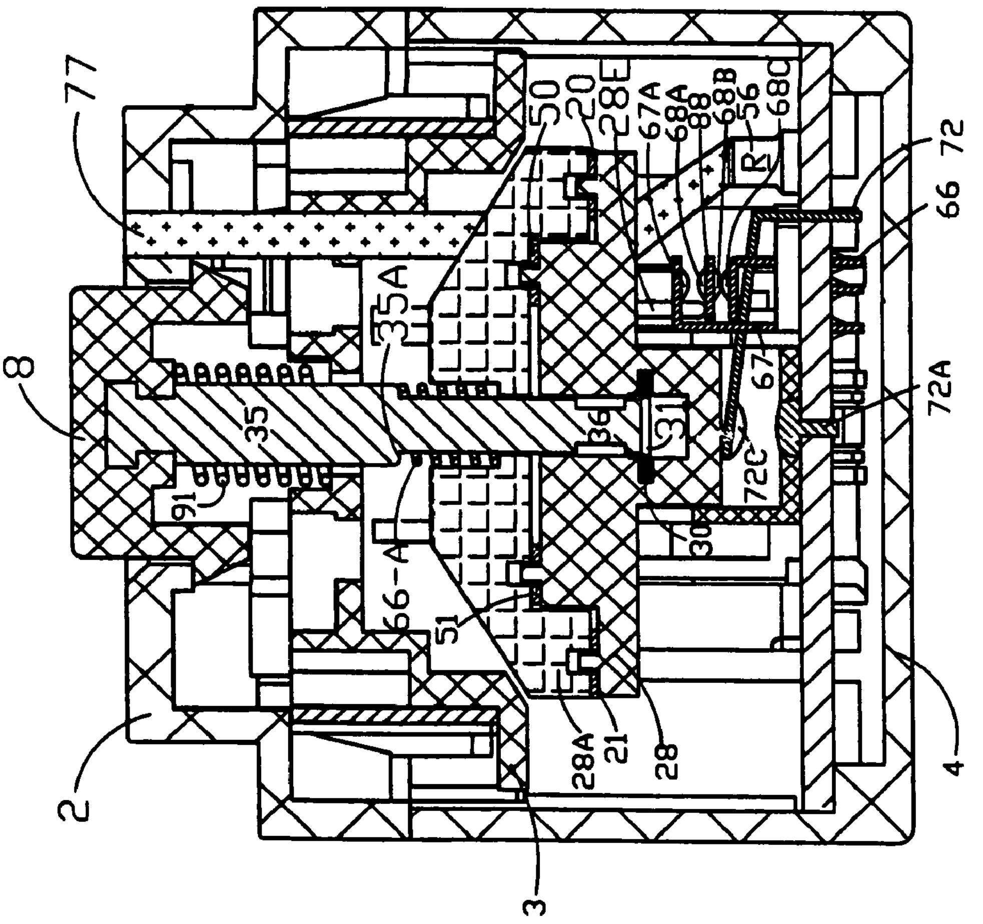
Figures 2, 9:
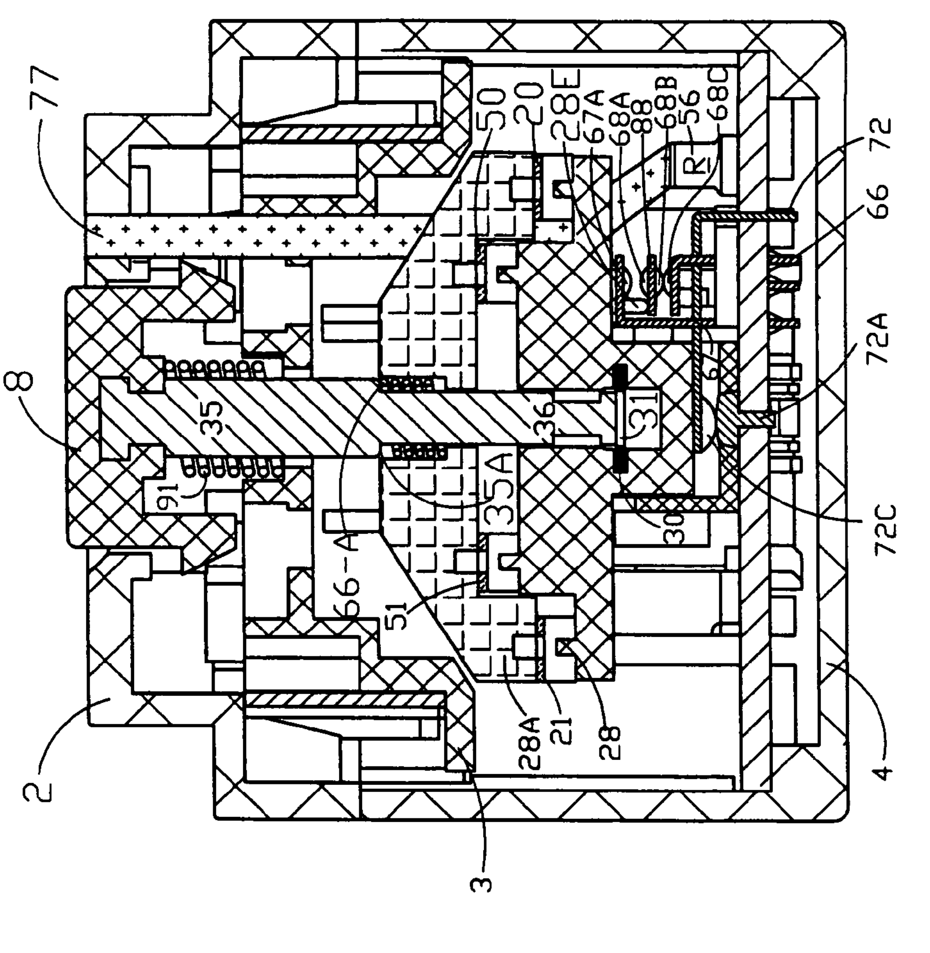
Figures 3, 9:
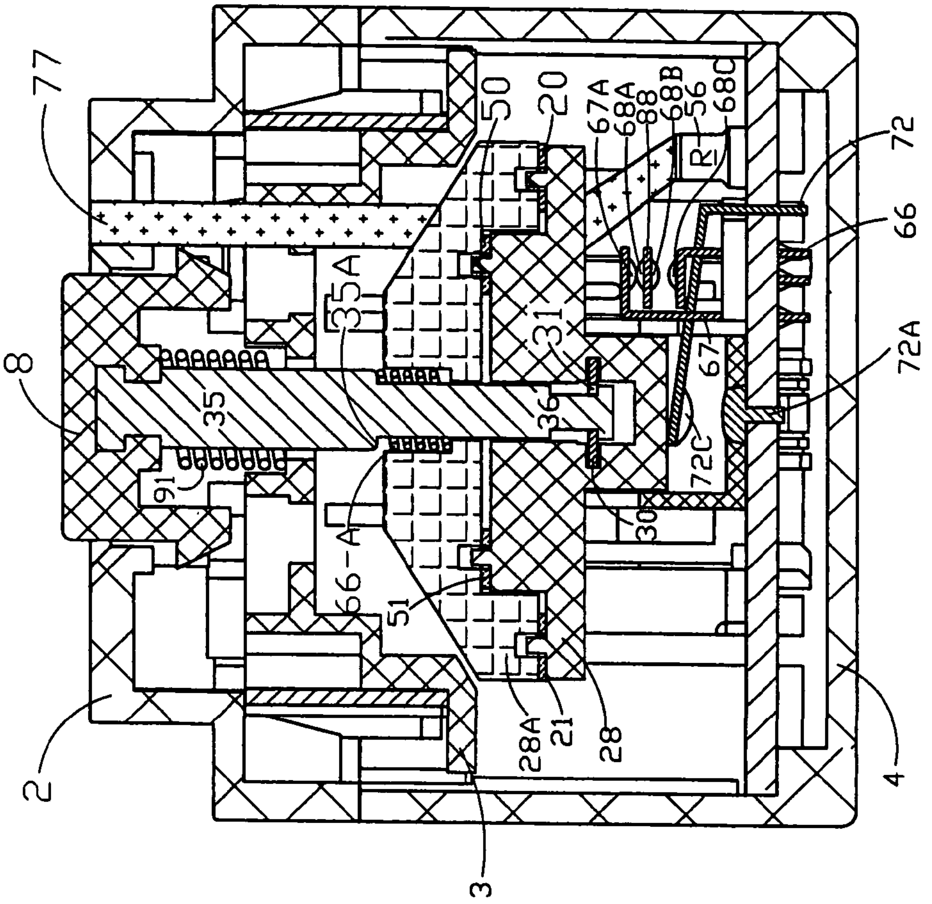

As shown in FIG. 5, through holes 69 are placed on input flexible metal pieces 51 and 50 and output conductor flexible metal pieces 21 and 20 at places corresponding to the vertical passing lines of protruding cylinders 28F on the left and right lifting arms of tripping device 28 to allow protruding cylinders 28F to pass through in order to be received by reset support piece 28A. As shown in FIG. 9-1, when tripping device 28 and reset support piece 28A are assembled, the protruding cylinders 28F on the left and right lifting arms of tripping device 28 are first passed through through-holes 69 on input flexible metal pieces 51 and 50 and output conductor flexible metal pieces 21 and 20, thus placing output conductor flexible metal pieces 21 and 20 above steps 28B on the outer side of the left and right lifting arms of tripping device 28 and placing input flexible metal pieces 51 and 50 above steps 27A on the inner side of the left and right lifting arms of tripping device 28 and below reset support piece 28A. Then, the protruding cylinders 28F are slide into the recessed round holes on the bottom surface of reset support piece 28A. At the same time when tripping device 28 coupled to reset button 8 move up and down, input flexible metal pieces 51 and 50 and output conductor flexible metal pieces 21 and 20 are also driven by the movement of reset button 8 to move up and down.

In the middle of the reset support piece 28A, there is a vertical through hole 29A that allows directional lock 35 to be threaded through. In the middle of tripping device 28, there is also a vertical through hole 29 to allow directional lock 35 to thread through. As shown in FIG. 7-1 and FIG. 9-1, directional lock 35, which is embedded underneath reset button 8 and onto which reset spring 91 and quick trip spring 66-A are slid, can move up and down along the straight through hole 29A and central through hole 29 in the middle sections of reset support piece 28A and tripping device 28. The diameter of the upper part of the directional lock 35 is larger than the diameter of the lower part. Step 35A is formed between the upper and lower parts of directional lock 35; reset spring 91 slides onto the upper part of directional lock 35 and is located between reset button 8 and insulated middle support 3; quick trip spring 66-A slides onto the lower part of directional lock 35 and is located between step 35A of directional lock 35 and reset support piece 28A. When the reset button is at a tripped state, reset support piece 28A is combined with tripping device 28 due to pushed pressure from quick trip spring 66-A.

A circular groove 36 is located near the bottom of directional lock 35. The bottom of directional lock 35 is a blunt plane 41. When reset button 8 is at a tripped state, blunt plane 41 of directional lock 35 and a through hole 31 in locking member 30 are in a staggered position so that directional lock 35 cannot pass through locking member 30.

Tripping device 28 has a through hole 30E in the middle section. Locking member 30 is a movable "L" shaped latch, preferably made of metal materials. It is inserted across the middle section of tripping device 28 by through hole 30E. When reset button 8 is in a tripped state, blunt plane 41 of directional lock 35 is above locking member 30 and is in a staggered state with locking member hole 31 on top of locking member 30.

A locking member spring 34 is placed between the side wall of tripping device 28 and the inside wall of locking member 28. A solenoid coil 26 with a built-in movable iron core 42 is placed on the outside wall of locking member 30. Built-in movable iron core 42 of solenoid coil 26 directly faces the side wall of locking member 30. When solenoid coil 26 is energized, the iron core moves inward and plunges upon the outside wall of locking member 30 to force locking member 30 to move horizontally, thus enabling blunt plane 41 of directional lock 35 below reset button 8 to be aligned with through hole 31 and move downward to facilitate reset of the device or move upward to facilitate tripping of the device. Movable iron core 42 has a tower shaped spring 42A slid at the end portion of the iron core 42.

Figure 6:
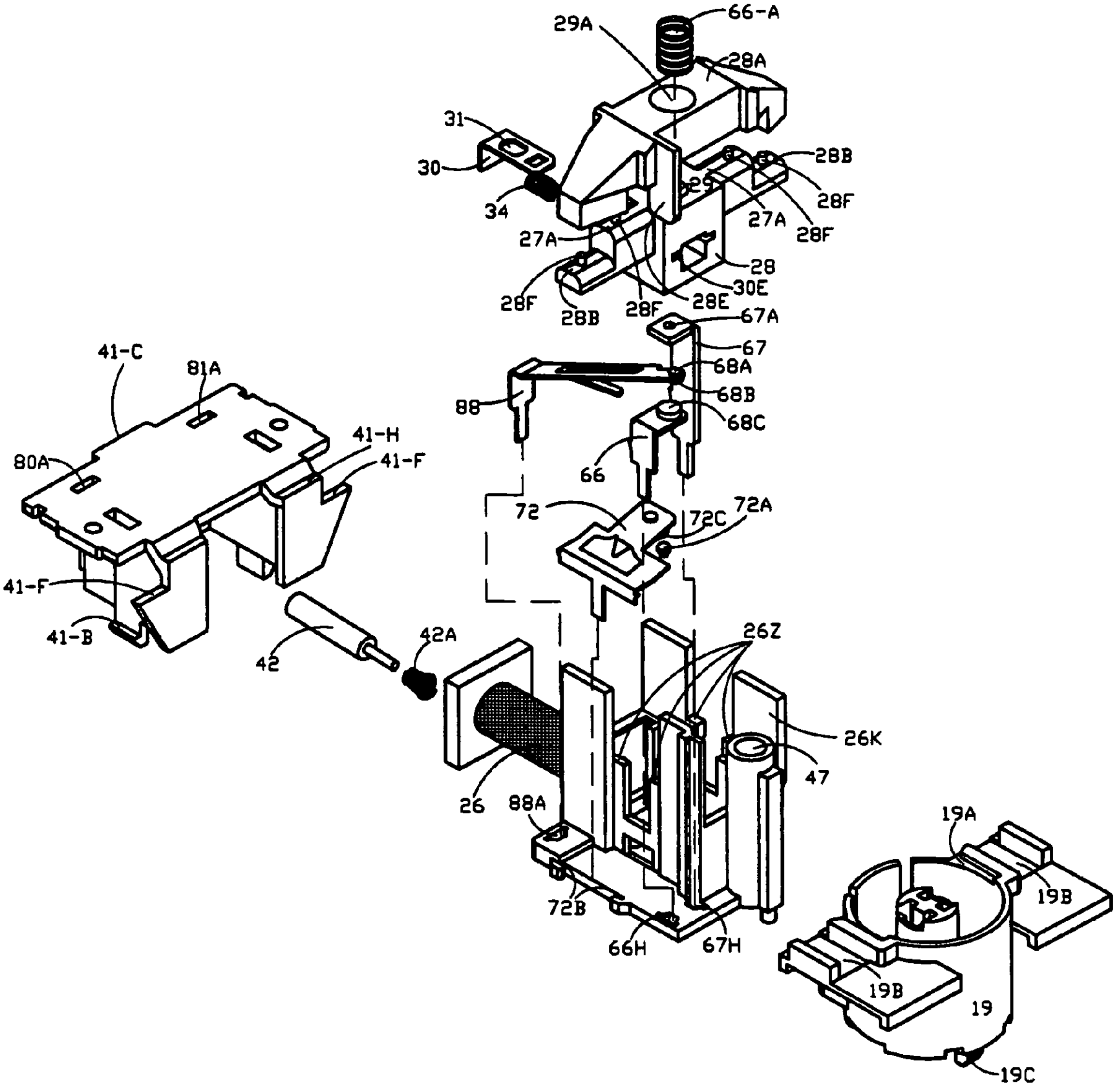
FIG. 6 is an exploded cubic schematic of the structure of the model reset/tripping mechanical construction of the present invention.

As shown in FIG. 6 and FIG. 9-1, a simulated leakage current generating switch (switch KR-1 in FIG. 10) is coupled to reset button (RESET) 8 and is placed beside tripping device 28. The simulated leakage current generating switch comprises three triangularly arranged metal switch pieces 66, 67 and 88. The first metal switch piece 66 is located at the bottom; the second flexible metal switch piece 88 is located in the middle; and the third metal switch piece 67 is at the top. On the upper surface of first metal switch piece 66, a contact 68C is placed. On the upper and lower surfaces of second flexible metal switch piece 88, contacts 68A and 68B are respectively placed. On the lower surface of third metal switch piece 67, a contact 67A is placed. Reset support piece 28A extends a touch pin 28E downward which is capable of pressing down on the second flexible metal switch piece 88. When the GFCI is properly wired and is at a tripped state, automatically due to the compression of quick trip spring 66-A, touch pin 28E of reset support piece 28A extends downward to cause contact 68B on the lower surface of the second flexible metal switch piece 88 to be in contact with contact 68C on the upper surface of first metal switch piece 66. As shown in FIG. 9-2, when reset button 8 is depressed, contact 68B on the lower surface of the second flexible metal switch piece 88 remains in contact with contact 68C on the upper surface of the first metal switch piece 66. As shown in FIG. 9-3, when the device is reset, both reset button 8 and tripping device 28 move up, driving reset support piece 28A to move up together with them and causing touch pin 28E to concurrently move away from the upper surface of the second flexible metal switch piece 88. Under its own flexible action, the second flexible metal switch piece 88 causes contact 68B on its lower surface to be disconnected from contact 68C on the upper surface of the first metal switch piece 66. Contact 68A on the upper surface of the second flexible metal switch piece 88 comes into contact with contact 67A on the lower surface of the third metal switch piece 67 and become conducted. As shown in FIG. 10, first metal switch piece 66 is at the bottom and is connected to the neutral line via differential transformer 19 and through simulated leakage current limiting resistor R4; second flexible metal piece 88 is in the middle and is connected to the hot line AC current via solenoid coil 26 (L3 in FIG. 10); third metal piece 67 is connected to the neutral line on the power input end through silicon controlled rectifier (SCR) V4. Therefore, when the GFCI is properly wired and is at a tripped state, the combined actions of quick trip spring 66-A and touch pin 28E of reset support piece 28A allows contact 68B on the lower surface of second flexible metal switch piece 88 to be in contact with contact 68C on the upper surface of first metal piece 66 to activate resistor R4 to automatically generate a simulated leakage current, thus achieving the purpose of, without the need to operate any part, testing the functionality of differential transformers L1 and L2, solenoid coil 26 (L3), the leakage current detection chip IC, and the SCR. The hot power line is connected to the neutral power line which threads through differential transformer L1 and L2 through solenoid coil 26 (L3), flexible metal piece 88, metal piece 66 and resistor R4, forming a simulated leakage current generating loop and automatically generating a simulated leakage current, to detect whether the GFCI has come to the end of its service life. If the GFCI has not come to the end of its service life, a reset indicator light V5 is lit. If the GFCI has come to the end of its service life, the GFCI prevents the reset button from being reset and the end-of-life reset indicator V5 is not lit. After reset button 8 is reset, the second flexible metal piece 88 is disconnected from the first metal piece 66, and comes into contact with third metal piece 67. The simulated leakage current that has been generated through the connection with first metal piece 66 disappears naturally.

In sum, when contact 68B on the lower surface of the second flexible metal piece 88 comes into contact with contact 68C on the upper surface of the first metal piece 66, a simulated leakage current is automatically generated. The GFCI is in an end-of-life testing state. When contact 68A on the upper surface of flexible metal piece 88 comes into contact with contact 67A on the lower surface of metal piece 67, the simulated leakage current disappears and the GFCI is in a reset state.

As shown in FIG. 6 and FIG. 7-1, a reset switch (KR-4 in FIG. 10) is coupled to reset button 8 and is placed below tripping device 28. The reset switch comprises flexible metal piece 72 and electric contact 72A. One end of flexible metal piece 72 is welded onto the circuit board and is connected to hot line on the power input end through solenoid coil 26 (L3 in FIG. 10); the other end is suspended in the air and above electric contact 72A. A contact 72C is on flexible metal piece 72 and is at a place directly above electric contact 72A. Electric contact 72A is welded onto the circuit board 18 and is connected to the positive pole of SCR V4. When reset button 8 is at a tripped state as shown in FIG. 7-1 and when reset button 8 is in a reset state as shown in FIG. 7-3, flexible metal piece 72 and contact 72A do not contact with each other. The reset switch is in a nonconductive state. When reset button 8 is pressed down, as shown in FIG. 7-2, tripping device 28 presses down on flexible metal piece 72, causing contact 72C of flexible metal piece 72 and contact 72A to come into contact and become conducted. The reset switch KR-4 is closed. When reset button 8 is released, as shown in FIG. 7-4, flexible metal piece 72 and contact 72A are disconnected, thus reflecting the condition of reset button 8.

As shown in FIG. 6, reset support piece 28A, tripping device 28, locking member 30, locking member spring 34, reset button 8, simulated leakage current generating switch 66, 67 and 88 coupled to reset button 8 as well as reset switch 72 and 72A are all shielded within solenoid framework 26K of the solenoid coil 26. There is a solenoid coil protection shield 41-C outside the coil of solenoid coil 26, on whose top surface there are four rectangular holes 80A and 81A; on its left and right sides, there is respectively a hooked pin 41-B which is used to hook onto circuit board 18. On the side of solenoid coil protection shield 41-C, there is a step 41-F which is used to support output conductor flexible metal pieces 21 and 20. At the place where the top surface and side of solenoid coil protection shield 41-C meet, there is a step 41-H which is used to support input flexible metal pieces 51 and 50, so as to reduce pressure from output conductor flexible metal pieces 21 and 20 and input flexible metal pieces 51 and 50 on the lifting arms on the left and right sides of tripping device 28. This would allow output conductor flexible metal pieces 21 and 20 and input flexible metal pieces 51 and 50 to work steadily.

Directional lock 35 that forms the reset/tripping mechanical device, reset spring 91 and quick trip spring 66-A that slide onto directional lock 35, reset support piece 28A, the "T" shaped tripping device 28 that is coupled to reset button 8, locking member 30, locking member spring 34, the simulated leakage current generating switch 66, 67 and 88 that is coupled to reset button 8, the reset switch 72 and 72A, and solenoid coil 26 are interconnected to form a freely movable body and support each other.

As shown in FIG. 7-1 and FIG. 3, below test button 7 there are flexible metal piece 46 and metal piece 47 which contains a simulated leakage current generating resistor R3. A pressing of test button 7 cause flexible metal piece 46 to be in contact with metal piece 47 which manually generates a simulated leakage current. The flexible metal piece 46 and the metal piece 47 (resistor R3 in FIG. 10) form test switch (KR-5) in FIG. 10. One end of flexible metal piece 46 is connected to the hot line of the power output end LOAD of the ground fault circuit interrupter, while the other end is suspended in the air and below it, there is the metal piece 47 which contains the simulated leakage current generating resistor R3; one end of the metal piece 47 is suspended below flexible metal piece 46, while the other end is connected to the neutral line at the power input end. As shown in FIG. 7-4, when test button 7 is depressed, flexible metal piece 46 comes into contact with metal piece 47 and manually generates a simulated leakage current. When test button 7 is released, flexible metal piece 46 is disconnected from the metal piece 47 and the simulated leakage current disappears.

FIG. 10 is the circuit diagram of the GFCI. As shown in the diagram, the control circuit mainly comprises differential transformers L1 (1000:1) and L2 (200:1) used for detecting an electric leakage current, control chip IC (RV4145), solenoid coil L3 (SOL) with a built in iron core, silicon controlled rectifier (SCR) V4, simulated leakage current generating switch KR-1 coupled to reset button RESET, switches KR-2-1, KR-2-2, KR-3-1 and KR-3-2 serially connected in the power supply line, reset switch KR-4 coupled to reset button RESET, reset indicator light V5, power output indicator light V3, simulated leakage current generating resistors R4 and R3 and some related diodes, resistor and capacitances, etc.

After the hot power line HOT and neutral power line WHITE on the power input line for the GFCI pass through differential transformers L1 and L2, they are connected to the hot line and neutral line output conducting socket in the plug hole of the single phase, three line socket on the surface of the GFCI through switches KR-2-1 and KR-2-2. At the same time, the hot line HOT, neutral line WHITE output conducting socket in the plug hole of the single phase, three line socket on the surface of the GFCI is connected to hot line HOT, neutral line WHITE of the output end (load connecting end) LOAD of the GFCI through another group of switches KR-3-1 and KR-3-2. Switches KR-2-1, KR-2-2, KR-3-1, and KR-3-2 are capable of moving up and down with the reset button RESET.

The leakage current detection signal output ends of differential transformers L1 and L2 are connected to signal input pins 1, 2, 3 and 7 of the control chip IC. Control signal output pin 5 of the control chip IC is connected to the gate of silicon controlled rectifier (SCR) V4. Power input pin 6 of control chip IC is connected to hot line HOT on the power input end LINE of the GFCI through diode V1, resistor R1 and solenoid coil L3. Ground pin 4 of control chip IC is connected to neutral line WHITE on the power input end LINE of the GFCI.

The negative pole of silicon controlled rectifier (SCR) V4 is connected to neutral line WHITE on the power input end LINE of the GFCI. The positive pole of silicon controlled rectifier (SCR) V4 is connected to the hot line HOT on the power input end through reset switch KR-4 and solenoid coil 26 coupled to reset button RESET. At the same time, the positive pole of silicon controlled rectifier (SCR) V4 is also connected to first metal switch piece 67 of the simulated leakage current generating switch KR-1.

Simulated leakage current generating switch KR-1 is a switch with a pair of constantly closed contacts and a pair of constantly open contact. The KR-1 contains a sharing point A, i.e., via the second flexible metal piece 88, which is connected to the hot line HOT on the power input end of the GFCI through solenoid coil L3. KR-1's constantly closed contact, i.e., metal piece 66, is connected to power neutral line WHITE that passes through differential transformers L1 and L2 through simulated leakage current generating resistor R4. KR-1's constantly open contact, i.e., metal piece 67, is connected to the positive pole of silicon controlled rectifier (SCR) V4.

The iron core built-in solenoid coil L3 causes reset button RESET to reset or trip through the reset/tripping mechanical device inside the GFCI, thus causing switches KR-2-1, KR-2-2, KR-3-1 and KR-3-2 to move with reset button RESET so as to establish or discontinue electric continuity among the input end, the output load end, and the user accessible load end. The iron core built-in solenoid coil L3 further causes the simulated leakage current generating switch KR-1 to disconnect or close.

A power output indicator light V3 (LED1) is connected between power output end LOAD of the hot line and the neutral line of the GFCI. It is used to indicate whether the GFCI has power output. When the GFCI has power output, LED1 is lit; otherwise, LED1 is not lit.

Between positive pole B of silicon controlled rectifier (SCR) V4 and sharing point A of simulated leakage current generating switch KR-1 is a reset indicator light V5 (LED2), which is used to indicate whether the GFCI has come to the end of its service life. When the leakage current protection circuit works normally, i.e., components comprising the leakage current protection circuit, such as silicon controlled rectifier V4, solenoid coil 3, differential transformers L1 and L2 and control chip IC are intact and cable of being conducted normally, the reset indicator light LED2 is lit, indicating that the GFCI has leakage current protection functions. Otherwise, when one of the components of the leakage current protection circuit fails, the end-of-life reset indicator LED2 is not lit, indicating that the leakage current protection circuit has come to the end of its life and reminding the user to get a good replacement the GFCI in a timely manner.

As shown in FIG. 9-1, the power output indicator light and the reset indicator light are side-by-side placed on control circuit board 18. A vertically placed light guide tube 77 is placed above the two indicator lights. The light guide tube 77 passes through hole D on insulated middle support 3 (as shown in FIG. 3), and its tip is located below indicator hole 30-A on the surface of upper cover 2.

An automatic simulated leakage current is formed when the neutral line WHITE of the power input end which threads through different transformers L1 and L2 is connected to the hot line HOT of the power input end through simulated leakage current generating resistor R4, the constantly closed contact of simulated leakage current switch KR-1 (i.e., metal piece 66), and solenoid coil L3 (SOL). After the power input end LINE of the GFCI is properly connected to the power line inside the wall and the device is in a tripped state, since the constantly closed contact of simulated leakage current switch KR-1 coupled to reset button RESET is in a closed state a simulated leakage current is generated. When the leakage current protection circuit works normally, after the leakage current is detected, the constantly closed contact of simulated leakage current generating switch KR-1 is disconnected through the reset/tripping mechanical device, and the constantly open contact closes, and therefore the simulated leakage current disappears and reset button RESET is reset.

As shown in FIG. 10, after the GFCI is properly wired to the wall and the reset button has not been reset and the pair of constantly closed contacts of simulated current generating switch KR-1 connects hot line HOT on the power input end to power neutral line WHITE that passes through differential transformers L1 and L2, the simulated leakage current generating circuit automatically generates a simulated leakage current. The leakage current flows through differential transformers L1 and L2 which outputs a signal to the control chip IC. Pin 5 of the control chip IC outputs a high potential control signal to the gate of silicon controlled rectifier (SCR) V4 to trigger SCR. The positive pole and the negative pole of the SCR are conducting. A large current flows through solenoid coil L3. Solenoid coil L3 generates a magnetic field to move its iron core into the solenoid coil and causes reset button RESET to act through the reset/tripping mechanical device. The reset button is reset, while at the same time, the constantly open contact of simulated current generating switch KR-1 is closed; the constantly closed contact is disconnected and the simulated leakage current disappears.

By contrast, if the leakage current protection circuit is not working properly and the GFCI has come to the end of its service life, then SCR V4 is not conducting so that no large current will flow through solenoid coil L3. As a result, no magnetic field is generated, and the built-in iron core within the solenoid coil does not act, so that the reset/tripping mechanical device does not act and the reset button cannot be reset. The reset indicator light V5 and the power output indicator light V3 are not lit, thus reminding the user that the GFCI has come to the end of its life and a good replacement the ground fault circuit interrupter is required.

As shown in FIG. 10, FIG. 7-2 and FIG. 9-2, when reset button RESET is depressed and when constantly closed contacts 68C and 68B of simulated leakage current generating switch KR-1 are not yet disconnected, but the reset switch KR-4 which is coupled to reset button RESET is closed. At this time, since the closure of KR-4 causes point A and point B to have a short connection, the original voltage on point A and point B is applied to solenoid coil (SOL) L3, causing a certain current to flow through the solenoid coil to generate a magnetic field. The iron core inside the solenoid coil is engaged in an impact movement. Through the reset/tripping mechanical device, the reset button can be reset, as shown in FIG. 7-3 and FIG. 8-1. Light emitting diode V5 connected between point A and point B is in a cut off state and indicator light V5 goes out. At the same time, due to the action of reset button RESET, constantly closed contacts 68B and 68C of the simulated leakage current switch KR-1 coupled thereto are disconnected. Constantly open contact 67A and 68A are closed, and the simulated leakage current disappears. After reset button RESET is reset, switch KR-2-1, KR-2-2, KR-3-1 and KR-3-2 coupled thereto are closed, the GFCI has power output and power output indicator light V3 is lit, indicating that both the single phase, three line socket on the surface of the interrupter and LOAD output end have power output.

Figures 1, 8:
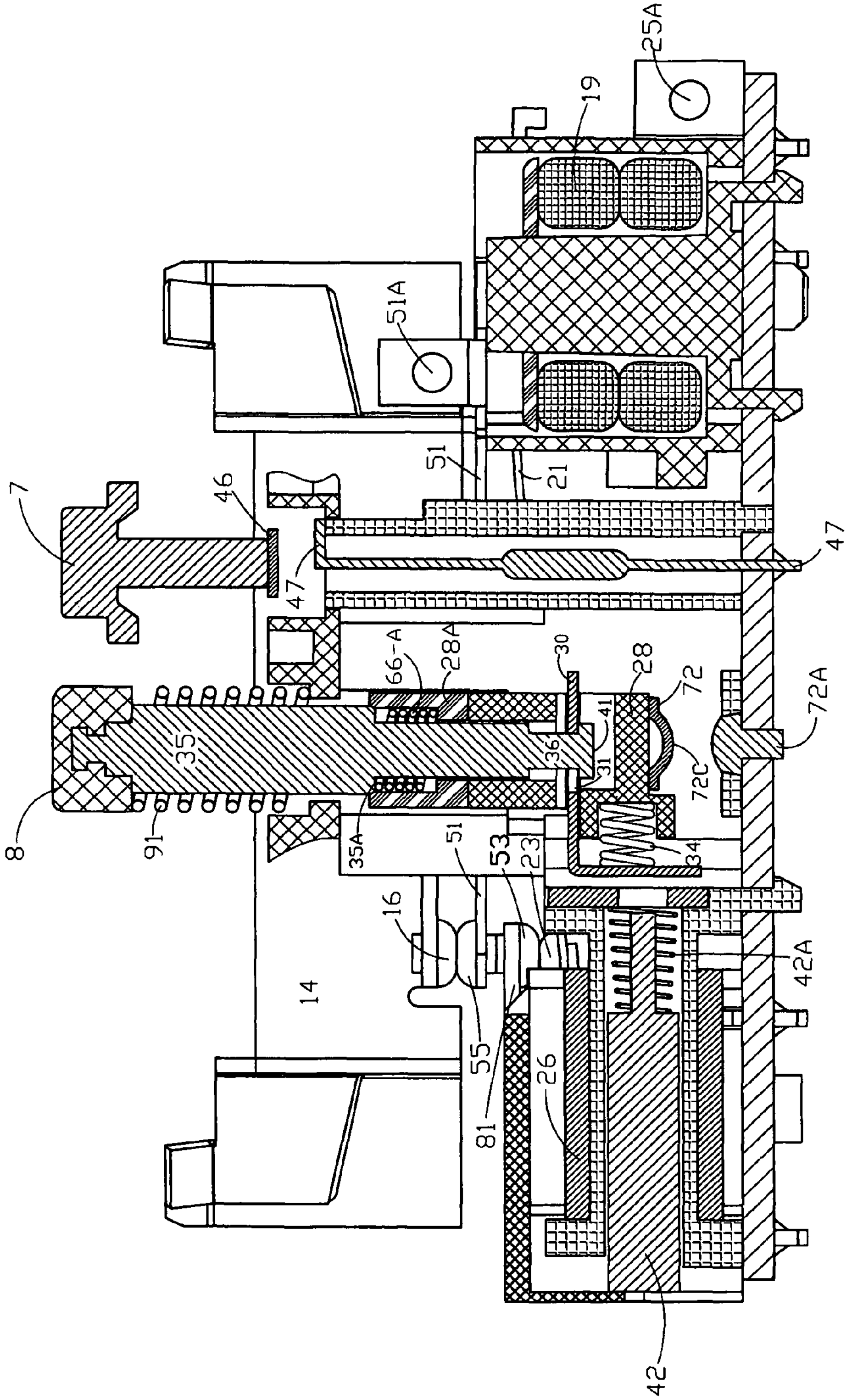
Figures 2, 8:
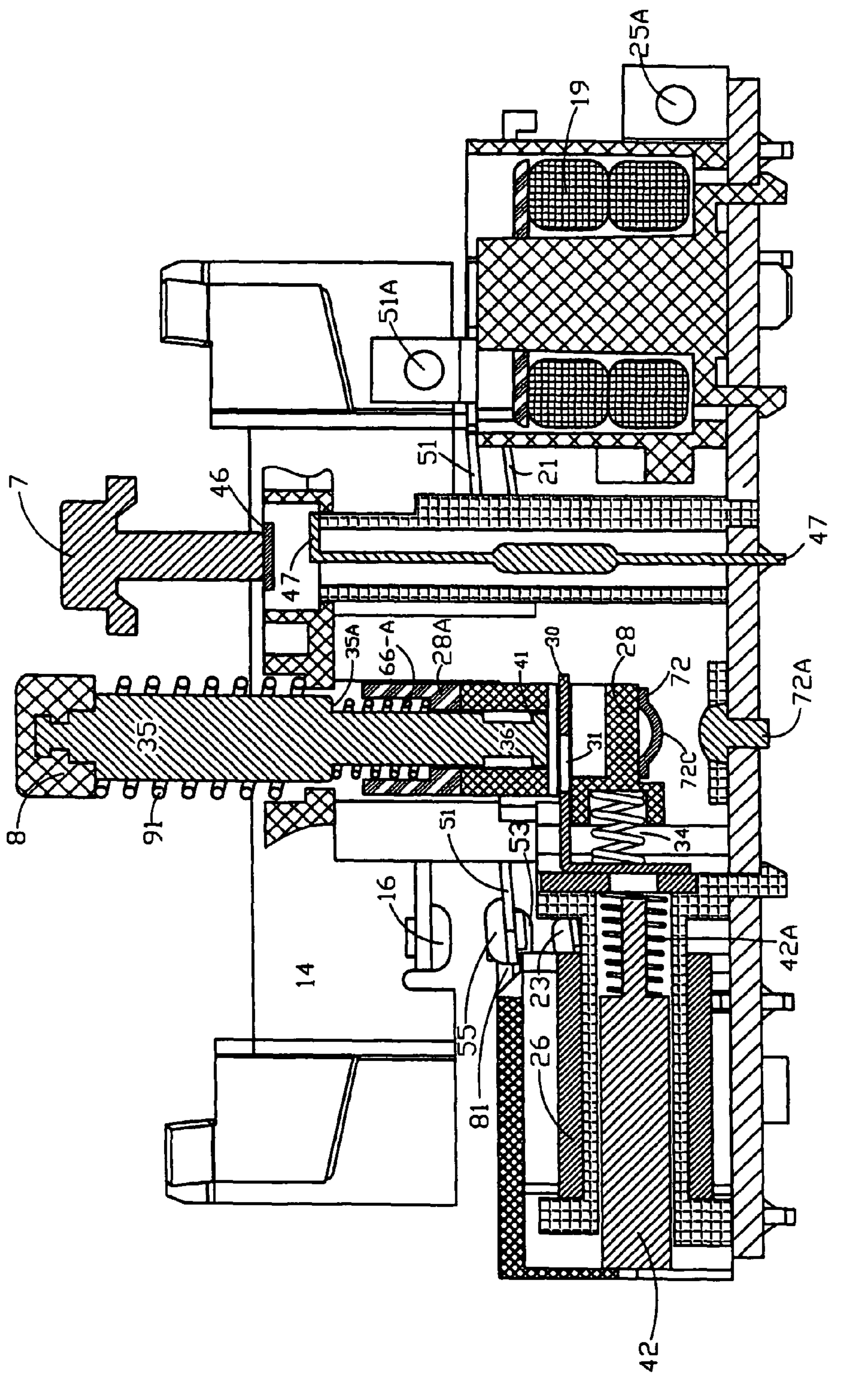

When the functions of the GFCI are intact, after the GFCI is powered and the reset button RESET is depressed, load end LOAD and the user accessible load end of the GFCI have power output and the GFCI works normally. At this time, if a leakage current is detected, due to the fact that hot power line HOT and neutral line WHITE both pass through the differential transformers L1 (1000:1) and L2 (200:1), because the currents from the two power lines, respectively, that passes through differential transformers L1 and L2 are not the same, differential transformers L1 and L2 immediately sent a voltage signal with a certain value to the control IC. A control signal is output from pin 5 of the IC to the gate of SCR V4. SCR V4 is triggered and the positive pole and the negative pole become conducted, thus causing point B on the positive pole of SCR V4 to be at a low electric potential. Because the constantly open contact of switch KR-1 is in a closed state, point A and point B are the same point. Since the other end of solenoid coil L3 is connected to the hot power line, both ends of solenoid coil L3 will receive a voltage of a certain value. A certain amount of electric current flows through the solenoid coil L3 and generates a magnetic field. The iron core within the solenoid coil is engaged in plunged onto the side wall of the locking member 30, causing reset button RESET to be tripped through the reset/tripping mechanical device and power output to be cut off. As shown in FIG. 8-2, power output indicator light V3 goes out and the reset indicator light V5 is lit.

When a test needs to be performed to determine whether the GFCI functions normally, as shown in FIG. 7-4, test button TEST 7 can be pressed, to cause test switch KR-5 coupled to the test button 7 to be closed, thus generating a simulated leakage current to test the components of the GFCI. If the leakage current protection circuit does not work normally and the GFCI has come to the end of its life, the reset indicator light V5 is not lit and reset button RESET cannot be reset.

In the situation as shown above, the control signal output from pin 5 of the IC must pass through and be connected to anti-jamming capacitance C5 between the gate of the SCR and ground to prevent the occurrence of triggering by error.

To improve the life of the ground fault circuit interrupter and avoid any damage to the GFCI caused by instantaneous high voltage such as lightning or as a result of any other cause, as shown in FIG. 10 and FIG. 5, the present invention provides discharge metal pieces 25A and 24A which are extended from the ends of the power input connecting pieces 25 and 24 that connect the GFCI with hot power line and neutral power line input wiring screws 10 and 9. The tips of the two metal pieces are placed opposite to each other and keep a certain distance from each other.

As shown in FIG. 10, FIG. 5, FIG. 7-1 and FIG. 8-1, the discharge metal pieces 51A and 50A can also be found on input flexible metal pieces 51 and 50 that pass through the differential transformers. The tips of the two discharge metal pieces are placed opposite to each other and keep a certain distance from each other.

In addition, hot line HOT of the power input end passes through solenoid coil SOL and a metal oxide varistor MOV to be connected to neutral line WHITE on the power input end.

When an instantaneous high voltage caused by lightning or any other cause acts on the ground fault circuit interrupter, the air media between the tips of the discharge metal pieces 25A and 51A, which are connected to the input end hot line, and the tips of discharge metal piece 24A and 50A, which are connected to the neutral line on the input end, is broken down, causing the air to discharge. Most of the high voltage is consumed through the discharging metal pieces, and the small remaining part is consumed through solenoid coil SOL and the metal oxide varistor MOV, thus protecting the ground fault circuit interrupter from being damaged by high voltage.

If the metal oxide varistor MOV used in the GFCI is a surge suppressing MOV, it has the capability of preventing electrophoresis.

As shown in FIG. 10, the GFCI of the present invention is also capable of preventing reverse wiring errors. As shown in FIG. 10, the load output end LOAD of the GFCI is connected to the single phase, three line output socket on the surface of the GFCI through switches KR-3-1 and KR-3-2 coupled to reset button RESET; hot line and neutral line on the input end the GFCI is connected to the hot line and neutral line of the single phase, three line output socket on the surface of the GFCI through switches KR-2-1 and KR-2-2. Therefore, when an installer erroneously connects the power line inside a wall to the load output end LOAD of a GFCI, the present invention will automatically prevent reset because no simulated leakage current can be generated through the simulated leakage current generation circuit (comprising the constantly closed contacts of simulated leakage current switch KR-1, resistor R4 and solenoid coil SOL). Control chip IC cannot output any control signal. SCR V5 is not conducted. No current flows through solenoid coil SOL, thus no magnetic field is generated to push the built-in iron core to act. The reset/tripping mechanical device does not act, thus automatically preventing the reset button from being reset. Because switches KR-2-1, KR-2-2, KR-3-1 and KR-3-2 are coupled to reset button RESET, the non-movement of the reset button causes switches KR-2-1, KR-2-2, KR-3-1 and KR-3-2 to stay opened. Neither the input end LINE nor the power socket on the surface of the GFCI has power output. Reset indicator light V5 is not lit, indicating a wiring error. It is only after the installer properly connects the wire then reset indicator light V5 can be lit, reset button can be reset and the GFCI has power output.

In conclusion, the GFCI disclosed in the present invention has the following outstanding advantages:

(1) The GFCI has superior testing capability: After the power input end of the GFCI is properly connected to the power line within the wall, without operating of any part, a simulated leakage current can be automatically generated to detect whether the GFCI has protective functions against the leakage current, i.e., whether or not it has come to the end of its life by displaying the test result.

a. When the components of the GFCI are working properly and the leakage current protection circuit has not come to the end of its life, the reset indicator light V5 is lit, indicating that a correct reset mechanism can be set up so that the reset button can be reset. After the reset, power output indicator light V3 is lit and reset indicator light V5 goes out, indicating that the GFCI can work normally;

b. When one or more of the components in the leakage current protection circuit are no longer functioning, reset indicator light V5 is not lit, indicating that the leakage current protection circuit has come to the end of its life and the reset button cannot be reset. Neither the load output end nor the power socket on the surface of the GFCI has power output. Power output indicator light V3 is not lit.

Therefore, the user can conclude whether the GFCI has come to the end of its life and its work status by the monitoring the reset indicator light V5 and power output indicator light V3.

(2) The GFCI has a Prolonged Service Life:

The present invention uses a quick trip spring 66-A slid onto directional lock 35. When the reset button is at a tripped state, quick trip spring 66-A allows touch pin 28E of reset support piece 28A to extend downward to steadily press onto the flexible metal switch piece 88, thus causing contact 68B on flexible metal piece 88 to be in steady and reliable contact with contact 68C of metal piece 66 to generate a simulated leakage current to test the device. After the reset button is reset, the quick trip spring 66-A is in a compressed state. When the reset button is tripped, said quick trip spring 66-A is released, thus assisting movable contacts 55 and 54 on input flexible metal pieces 51 and 50 to be quickly detached from fixed contacts 16 and 15 on power output conductors 14 and 13 and movable contacts 23 and 22 on output conductor flexible metal pieces 21 and 20 to be quickly detached from fixed contacts 53 and 53 on power output terminal metal pieces 81 and 80. This guarantees minimal detachment time, thus reducing the arc generated by the detachment of movable and fixed contacts, and prolonging the life of the movable and fixed contacts and prolonging the life of the GFCI.

(3) The GFCI has high voltage surge protection function: The GFCI of the present invention contains a pair of input power connecting pieces which has a pair of discharge metal pieces. During a high voltage surge, the discharge metal pieces of said input power connecting pieces cause a discharge of electricity through the tips of the discharge metal pieces to protect the GFCI from being damaged due to the high voltage surge.

(4) The GFCI has Manual End-of-Life Detect Function:

a. When a leakage current is generated through manual simulation, if the GFCI works normally and has not come to the end of its life, reset indicator light V5 is lit, indicating that the GFCI can work normally and can be reset. After it is reset, reset indicator light V5 goes off and power output indicator light V3 is lit;

b. When a leakage current is generated through manual simulation and the leakage current protection circuit has come to the end of its life, reset indicator light V5 is not lit, indicating that the GFCI has come to the end of its life and the reset button is prevented from reset. The load output end of the GFCI and the single phase, three line power output sockets on the surfaces of the GFCI have no power output. The power output indicator light V3 is not lit.

(5) The GFCI has Reverse Wiring Protection:

When an installer or electrician erroneously connects the hot power line inside a wall to the power output end LOAD of a ground fault circuit interrupter, the automatic testing of the GFCI through the simulated leakage current generation circuit does not work and the GFCI cannot reset. The GFCI has no power output. Reset indicator light V5 is not lit, indicating a wiring error. It is only after the installer properly connects the wire then the reset indicator light V5 can be lit, reset button can be reset, and the power output end of the GFCI has power output. The power output indicator light V3 is lit.

While the GFCI with an automatic end-of-life test has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

What is claimed is:

1. A circuit interrupting device having an input end which is electrically connected to an input power source, an output end which is electrically connected to an output terminal, and a user accessible load end which is electrically connected to a user accessible output socket; wherein said circuit interrupting device comprises:

a simulated leakage current generating switch (KR-1) coupled to a reset button;

wherein when said circuit interrupting device is properly wired and in a tripped state, said simulated leakage current generating switch automatically causes said circuit interrupting device to generate a simulated leakage current which is capable of testing components of said circuit interrupting device, wherein said simulated leakage current ceases to be generated when said circuit interrupting device is reset.

2. The circuit interrupting device according to claim 1, wherein said simulated leakage current generating switch comprises a first switch piece, a second switch piece, and a third switch piece with said first switch piece located at the bottom; said second switch piece situated in the middle; and said third switch piece located at the top.

3. A circuit interrupting device having an input end which is electrically connected to an input power source, an output end which is electrically connected to an output terminal, and a user accessible load end which is electrically connected to a user accessible output socket; wherein said circuit interrupting device comprises:

a simulated leakage current generating switch (KR-1) coupled to a reset button;

wherein when said circuit interrupting device is properly wired and in a tripped state, said simulated leakage current generating switch automatically causes said circuit interrupting device to generate a simulated leakage current which is capable of testing components of said circuit interrupting device, wherein said simulated leakage current generating switch comprises a first switch piece, a second switch piece, and a third switch piece with said first switch piece located at the bottom; said second switch piece situated in the middle; and said third switch piece located at the top;

wherein said first switch piece is in series with a resistor and is electrically connected to a neutral line of said input power source; wherein said first switch piece has a contact located at an upper end of said first switch piece;

wherein said second switch piece is electrically connected to a hot line of said input power source via a solenoid coil; wherein said second switch piece has two contacts located at an upper and a lower ends of said second switch piece;

wherein a third switch piece is electrically connected to said neutral line of said input power source through a silicon controlled rectifier (SCR); wherein said third switch piece has a contact located at a lower end of said third switch piece.

4. The circuit interrupting device according to claim 2, wherein said second switch piece is in contact with said first switch piece when said circuit interrupting device is connected to the wall and said reset button is in a tripped state to allow said simulated leakage current to be generated automatically.

5. A circuit interrupting device having an input end which is electrically connected to an input power source, an output end which is electrically connected to an output terminal, and a user accessible load end which is electrically connected to a user accessible output socket; wherein said circuit interrupting device comprises:

a simulated leakage current generating switch (KR-1) coupled to a reset button;

wherein when said circuit interrupting device is properly wired and in a tripped state, said simulated leakage current generating switch automatically causes said circuit interrupting device to generate a simulated leakage current which is capable of testing components of said circuit interrupting device, wherein said simulated leakage current generating switch comprises a first switch piece, a second switch piece, and a third switch piece with said first switch piece located at the bottom; said second switch piece situated in the middle; and said third switch piece located at the top;

wherein a reset support piece is located underneath said reset button; wherein when said reset button is in a tripped state, said reset support piece has a touch pin which is capable of extending downward to push said second switch piece into contact with said first switch piece to allow said simulated leakage current to be generated automatically.

6. The circuit interrupting device according to claim 1, further comprising a test switch (KR-5) coupled to a test button; wherein said test switch comprises a flexible test switch piece and a metal piece in series with a simulated leakage current generating resistor; whereby when said test button is depressed, said flexible test switch piece is in contact with said metal piece to manually generate said simulated leakage current to test said circuit interrupting device.

7. The circuit interrupting device according to claim 6, wherein said flexible test switch piece is electrically connected to a hot wire of said load end; and wherein said metal piece is electrically connected to a neutral wire of said input power end.

8. The circuit interrupting device according to claim 1, further comprising a reset indicator light; wherein when said circuit interrupting device is properly wired and in a tripped state, and when components of said circuit interrupting device work properly, said reset indicator light lights up.

9. The circuit interrupting device according to claim 8, further comprising a power output indicator light; wherein when said circuit interrupting device has power to said output end and said user accessible load end, said power output indicator light is lit.

10. The circuit interrupting device according to claim 1, further comprising a pair of output power conductors extended to said user accessible load end; wherein each of said pair of said output power conductors comprising a fixed contact and an output conductor flexible metal piece containing a movable contact;

a pair of output terminal metal pieces, each comprising a fixed contact; and a pair of input flexible metal pieces electrically connected to said input power source; wherein each of said pair of said input flexible metal pieces contains a movable contact;

wherein said movable contact of said output conductor flexible metal piece is capable of connecting to or disconnecting from said fixed contact on one of said output terminal metal pieces and each of said input flexible metal pieces is capable of connecting to or disconnecting from said fixed contact on one of said output conductors to establish or discontinue electrically continuity between said input end, said output end, and said user accessible load end.

11. The circuit interrupting device according to claim 1, further comprising a pair of input power connecting pieces, each being electrically connected to a hot or a neutral wire of said input power source respectively;

wherein each of said input power connecting pieces has an end extended to a discharge metal piece having a tip; and wherein said tip of said discharge metal piece of one input power connecting piece faces, but does not contact with, said tip of said discharge metal piece from the other input power connecting piece;

whereby during a high voltage surge said discharge metal pieces of said input power connecting pieces cause a discharge of electricity through said tips of said discharge metal pieces to protect said circuit interrupting device from being damaged due to said high voltage surge.

12. The circuit interrupting device according to claim 11, wherein each of a pair of input flexible metal pieces comprises a discharge metal piece with a tip facing but not contacting the tip of the other discharge metal piece in the opposite direction; whereby during a high voltage surge said discharge metal pieces of said input flexible metal pieces cause a discharge of electricity through said tips of said discharge metal pieces to protect said circuit interrupting device from being damaged due to said high voltage surge.

13. The circuit interrupting device according to claim 1, further comprising a reset switch (KR-4) coupled to said reset button; wherein said reset switch comprises a flexible metal switch piece and an electric contact; whereby when said circuit interrupting device is properly wired and in a tripped state, a depression of said reset button allows said flexible reset switch piece to be in contact with said electric contact to allow reset.

14. The circuit interrupting device according to claim 13, wherein one end of said flexible metal switch piece is electrically connected to a hot wire of said input power end through a solenoid coil and the other end is suspended; wherein said electric contact is electrically connected to a neutral wire of said input power end; whereby when said reset button is depressed, said flexible metal switch piece is in contact with said electric contact.

15. The circuit interrupting device according to claim 1, wherein said components of said circuit interrupting device comprises solenoid coil and silicon controlled rectifier (SCR).

16. The circuit interrupting device according to claim 15, further comprises a differential transformer and a leakage current detection integrated chip.

17. A circuit interrupting device having an input end which is electrically connected to an input power source, an output end which is electrically connected to an output terminal, and a user accessible load end which is electrically connected to a user accessible output socket; wherein said circuit interrupting device comprises:

a reset switch (KR-4) coupled to a reset button; wherein said reset switch comprises a flexible metal switch piece and an electric contact; whereby when said circuit interrupting device is properly wired and in a tripped state, a simulated leakage current is generated capable of testing components of said circuit interrupting device, a depression of said reset button allows said flexible reset switch piece to be in contact with said electric contact to allow reset, wherein said simulated leakage current ceases to be generated when said circuit interrupting device is reset.

18. The circuit interrupting device according to claim 17, wherein one end of said flexible metal switch piece is electrically connected to a hot wire of said input power end through a solenoid coil and the other end is suspended; wherein said electric contact is electrically connected to a neutral wire of said input power end; whereby when said reset button is depressed, said flexible metal switch piece is in contact with said electric contact.

19. The circuit interrupting device according to claim 17, further comprising a pair of input power connecting pieces, each being electrically connected to said hot or said neutral wire of said input power source respectively;

wherein each of said input power connecting pieces has an end extended to a discharge metal piece having a tip facing but not contacting the tip of the other discharge metal piece in opposite direction;

whereby during a high voltage surge said discharge metal pieces of said input power connecting pieces cause a discharge of electricity through said tips of said discharge metal pieces to protect said circuit interrupting device from being damaged due to said high voltage surge.

20. The circuit interrupting device according to claim 19, further comprising a pair of input flexible metal pieces electrically connected to said input power source; wherein each of said input flexible metal pieces comprises a discharge metal piece with a tip facing but not contacting the tip of the other discharge metal piece in opposite direction.

21. The circuit interrupting device according to claim 19, wherein said hot wire of said input power source is operationally connected to said neutral wire of said input power source through a solenoid coil and a metal oxide varistor (MOV).

22. The circuit interrupting device according to claim 17, further comprising:

a pair of output power conductors extended to said user accessible load end; wherein each of said pair of said output power conductors comprising a fixed contact and an output conductor flexible metal piece containing a movable contact;

a pair of output terminal metal pieces, each comprising a fixed contact; and a pair of input flexible metal pieces electrically connected to said input power source; wherein each of said pair of said input flexible metal pieces contains a movable contact;

wherein said movable contact of said output conductor flexible metal piece is capable of connecting to or disconnecting from said fixed contact on one of said output terminal metal pieces and each of said input flexible metal pieces is capable of connecting to or disconnecting from said fixed contact on one of said output conductors to establish or discontinue electrically continuity between said input end, said output end, and said user accessible load end.

* * * * *